(12) United States Patent  (10) Patent No.: US 8,683,751 B2
Stearns  (45) Date of Patent: *Apr. 1, 2014

(54) ROOF MOUNT HAVING BUILT-IN FAILURE

(75) Inventor: Brian Cecil Stearns, Stowe, VT (US)

(73) Assignee: Vermont Slate & Copper Services, Inc., Morrisville, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/272,604

(22) Filed: Oct. 13, 2011

(65) Prior Publication Data

US 2013/0009025 A1 Jan. 10, 2013

Related U.S. Application Data

(60) Provisional application No. 61/505,670, filed on Jul. 8, 2011.

(51) Int. Cl.
*E04B 1/68* (2006.01)

(52) U.S. Cl.
USPC ............................ 52/58; 52/173.1; 52/745.21

(58) Field of Classification Search
USPC ........................ 52/4–26, 58, 60, 173.1, 173.3, 52/409–411, 698, 302.6, 302.7, 97, 52/741.42; 126/621, 623; 136/244; 248/237, 500, 505; 285/42–43; 411/439, 542
See application file for complete search history.

(56) References Cited

U.S. PATENT DOCUMENTS

| | | |
|---|---|---|
| 473,512 A | 4/1892 | Laird |
| 756,884 A | 4/1904 | Parry |
| 1,646,923 A | 10/1927 | Martens |
| 1,925,263 A | 9/1933 | Levow |
| 2,079,768 A | 5/1937 | Levow |
| 2,349,467 A | 5/1944 | Scott |
| D139,568 S | 11/1944 | Hinchman |

(Continued)

FOREIGN PATENT DOCUMENTS

| | | |
|---|---|---|
| CH | 204783 | 5/1939 |
| CH | 671063 A5 | 7/1989 |

(Continued)

OTHER PUBLICATIONS

"Sunmodo Solar Mounting System" Brochure (Available at least as early as Oct. 20, 2011).

(Continued)

*Primary Examiner* — Brian Glessner
*Assistant Examiner* — Beth Stephan
(74) *Attorney, Agent, or Firm* — Michael Best & Friedrich LLP

(57) ABSTRACT

A roof attachment assembly to be mounted on a roof substrate. The assembly comprises a plate having a substantially frustoconical protrusion, the plate defining a first surface and a second surface and including an aperture. The assembly further comprises a first membrane positioned adjacent to the first surface of the plate, a second membrane positioned adjacent to the second surface of the plate, a bracket positioned proximate the second membrane and the second surface of the plate, the bracket operable to support one or more roof-mounted fixtures, and a fastener extending through the bracket, the membranes, and the plate, the fastener operable to couple the bracket, the membranes and the plate. The assembly also comprises a second fastener that substantially mates with the bracket, wherein at least one of the fastener, the plate, the first membrane, and the second fastener includes at least one pre-determined breaking point.

35 Claims, 10 Drawing Sheets

(56) References Cited

U.S. PATENT DOCUMENTS

| | | |
|---|---|---|
| 2,890,664 A | 6/1959 | Rachlin |
| 2,925,976 A | 2/1960 | Martin |
| D188,221 S | 6/1960 | Maro |
| 3,141,532 A | 7/1964 | Runyan |
| 3,182,762 A | 5/1965 | Syak et al. |
| 3,633,862 A | 1/1972 | Breen |
| 3,880,405 A | 4/1975 | Brueske |
| 3,937,121 A | 2/1976 | Schubert |
| 3,998,019 A | 12/1976 | Reinwall, Jr. |
| 4,226,058 A | 10/1980 | Riley |
| 4,269,012 A | 5/1981 | Mattingly et al. |
| 4,321,745 A | 3/1982 | Ford |
| 4,325,178 A | 4/1982 | Pruehs |
| 4,348,846 A | 9/1982 | Bellem |
| 4,367,864 A | 1/1983 | Eldeen |
| 4,404,962 A | 9/1983 | Zinn et al. |
| 4,554,773 A | 11/1985 | Conley |
| D293,203 S | 12/1987 | Hertensteiner |
| D294,904 S | 3/1988 | Bleskachek |
| 4,744,187 A | 5/1988 | Tripp |
| 4,763,456 A | 8/1988 | Giannuzzi |
| 4,778,702 A | 10/1988 | Hutter, III |
| 4,796,403 A | 1/1989 | Fulton et al. |
| 4,892,429 A | 1/1990 | Giannuzzi |
| 4,903,997 A | 2/1990 | Kifer |
| 4,927,305 A | 5/1990 | Peterson, Jr. |
| 5,082,412 A | 1/1992 | Thomas |
| 5,127,205 A | 7/1992 | Eidson |
| 5,207,043 A | 5/1993 | McGee et al. |
| 5,217,191 A | 6/1993 | Smith |
| 5,228,248 A | 7/1993 | Haddock |
| 5,353,473 A | 10/1994 | Sherick |
| 5,431,372 A | 7/1995 | Kostelecky |
| 5,483,772 A | 1/1996 | Haddock |
| 5,491,931 A | 2/1996 | Haddock |
| D368,648 S | 4/1996 | Losier |
| 5,528,872 A | 6/1996 | Rotter |
| 5,547,226 A | 8/1996 | Wentworth |
| 5,557,903 A | 9/1996 | Haddock |
| 5,609,326 A | 3/1997 | Stearns et al. |
| 5,613,328 A | 3/1997 | Alley |
| 5,685,508 A | 11/1997 | Smith |
| 5,687,936 A | 11/1997 | Wilson |
| D388,136 S | 12/1997 | Lecocq et al. |
| 5,692,352 A | 12/1997 | Simpson |
| 5,694,721 A | 12/1997 | Haddock |
| 5,715,640 A | 2/1998 | Haddock |
| 5,797,232 A | 8/1998 | Larson |
| 5,813,649 A | 9/1998 | Peterson et al. |
| 5,873,201 A | 2/1999 | Fey |
| 5,882,043 A | 3/1999 | Murphy et al. |
| D409,078 S | 5/1999 | Bolt |
| 5,983,588 A | 11/1999 | Haddock |
| D426,453 S | 6/2000 | Stearns et al. |
| D428,799 S | 8/2000 | Stearns et al. |
| D430,005 S | 8/2000 | Stearns et al. |
| 6,164,033 A | 12/2000 | Haddock |
| 6,193,455 B1 | 2/2001 | Levey |
| 6,354,046 B1 | 3/2002 | Swearingen |
| 6,360,491 B1 | 3/2002 | Ullman |
| 6,414,237 B1 | 7/2002 | Boer |
| 6,453,623 B1 | 9/2002 | Nelson et al. |
| 6,470,629 B1 | 10/2002 | Haddock |
| 6,514,005 B2 | 2/2003 | Shiokawa et al. |
| 6,526,701 B2 | 3/2003 | Stearns et al. |
| 6,536,729 B1 | 3/2003 | Haddock |
| 6,718,718 B2 | 4/2004 | Haddock |
| 6,868,647 B2 | 3/2005 | Poldmaa |
| 6,918,724 B2 | 7/2005 | Eriksson |
| 7,013,612 B2 | 3/2006 | Haddock |
| 7,069,698 B2 | 7/2006 | Nee |
| 7,100,338 B2 | 9/2006 | Haddock |
| 7,174,677 B1 | 2/2007 | Dressler |
| 7,260,918 B2 | 8/2007 | Liebendorfer |
| 7,434,362 B2 | 10/2008 | Liebendorfer |
| 7,600,349 B2 | 10/2009 | Liebendorfer |
| 7,686,268 B2 | 3/2010 | Terunuma et al. |
| 7,703,256 B2 | 4/2010 | Haddock |
| D617,174 S | 6/2010 | Schaefer et al. |
| 7,730,901 B2 | 6/2010 | Ball |
| 7,758,011 B2 | 7/2010 | Haddock |
| 7,762,027 B1 | 7/2010 | Wentworth et al. |
| 7,789,365 B2 | 9/2010 | Durig et al. |
| 7,857,269 B2 | 12/2010 | Plaisted et al. |
| 7,861,485 B1 * | 1/2011 | Wentworth et al. ........ 52/745.06 |
| 7,866,099 B2 | 1/2011 | Komamine et al. |
| 7,895,808 B1 | 3/2011 | Wentworth et al. |
| 7,900,413 B2 | 3/2011 | Stanley |
| 7,905,064 B1 | 3/2011 | Wentworth et al. |
| 7,935,202 B2 | 5/2011 | Stanley |
| 7,946,082 B2 | 5/2011 | Ohkoshi et al. |
| 7,956,280 B2 | 6/2011 | Kobayashi |
| 7,987,641 B2 | 8/2011 | Cinnamon |
| 8,122,648 B1 | 2/2012 | Liu |
| 8,136,311 B2 * | 3/2012 | Liu .............................. 52/173.3 |
| 8,166,720 B2 * | 5/2012 | Garrigus et al. ................. 52/410 |
| 8,448,405 B2 | 5/2013 | Schaefer et al. |
| 2002/0035811 A1 | 3/2002 | Heuel |
| 2002/0046506 A1 | 4/2002 | Ullman |
| 2002/0088196 A1 | 7/2002 | Haddock |
| 2002/0131842 A1 | 9/2002 | Eriksson |
| 2003/0101662 A1 | 6/2003 | Ullman |
| 2003/0177706 A1 | 9/2003 | Ullman |
| 2004/0173373 A1 | 9/2004 | Wentworth et al. |
| 2006/0010786 A1 | 1/2006 | Rogers |
| 2007/0245636 A1 | 10/2007 | Ayer et al. |
| 2007/0266672 A1 | 11/2007 | Bateman et al. |
| 2007/0289233 A1 | 12/2007 | Haddock |
| 2008/0000173 A1 | 1/2008 | Lenox et al. |
| 2008/0087275 A1 | 4/2008 | Sade et al. |
| 2008/0190047 A1 | 8/2008 | Allen |
| 2008/0245404 A1 | 10/2008 | DeLiddo |
| 2008/0313976 A1 | 12/2008 | Allen |
| 2009/0309388 A1 | 12/2009 | Ellison |
| 2010/0192505 A1 | 8/2010 | Schaefer et al. |
| 2010/0236155 A1 | 9/2010 | Lanza |
| 2010/0307074 A1 | 12/2010 | Stearns et al. |
| 2011/0120047 A1 | 5/2011 | Stearns et al. |
| 2011/0135882 A1 | 6/2011 | Stanley |
| 2011/0138602 A1 | 6/2011 | Stanley |
| 2011/0162779 A1 | 7/2011 | Stanley |
| 2011/0204195 A1 | 8/2011 | Stanley |
| 2011/0240207 A1 | 10/2011 | Stanley |
| 2011/0247279 A1 | 10/2011 | Stearns et al. |
| 2011/0247295 A1 | 10/2011 | Stearns et al. |
| 2012/0017529 A1 | 1/2012 | Shadwell et al. |
| 2013/0298494 A1 | 11/2013 | Corsi |

FOREIGN PATENT DOCUMENTS

| | | |
|---|---|---|
| DE | 3716491 A1 | 12/1988 |
| DE | 3723020 A1 | 1/1989 |
| GB | 666147 | 2/1952 |
| JP | 5-346055 | 12/1993 |
| JP | 8193392 | 7/1996 |
| WO | 2011032134 | 3/2011 |

OTHER PUBLICATIONS

"Tecsun (UL) PV-Wire" Brochure, Prysmian Cables and Systems USA, LLC Brochure, Schletter Inc. (Available at least as early as Oct. 20, 2011).

TileTrac Product Photograph (Available at least as early as Jun. 8, 2011).

"TileTrac Tile Roof Structural Attachment" Brochure, Professional Solar Products, Inc., Copyright Mar. 2011.

UFD (Universal Fastening Disc) Installation Instructions and Design Drawings (Available at least as early as Jul. 14, 2011).

"Zilla Racking & Mounting Components" Zilla Corporation, Copyright 2011.

"Zilla The King of Racking Racking Systems" Brochure, Zilla Corporation (Available at least as early as Oct. 20, 2011).

(56) References Cited

OTHER PUBLICATIONS

"Zilla Zip Flashing Assembly Instructions" Zilla Corporation, Copyright 2011.
"Zilla Zip Single-Bolt Flashing Assembly" Brochure, Zilla Corporation, Copyright 2011.
"Zilla Zip Single-Bolt Flashing Assembly" Zilla Corporation, Copyright 2011.
"AET T6 Pitched Roof PV Rail System" Brochure, Applied Energy Technologies (Available at least as early as Oct. 20, 2011).
Affordable Solar, UniRac PRO-PAK Standard Rail 204, available at least as early as Jan. 9, 2009.
Affordable Solar, Solar Panel Mounts & Solar Trackers for Solar Power Systems, available at least as early as Jan. 9, 2009.
"E-Ton Solar" Brochure, E-Ton Solar Tech. Co., Ltd. (Available at least as early as Oct. 20, 2011).
"Fall Protection in Contruction", OSHA Laws 3146; 1995.
"Genmounts Solar Racking Systems" Brochure (Available at least as early as Oct. 20, 2011).
"Mage Powertec Kits" Brochure, Mage Solar Projects, Inc. (Available at least as early as Oct. 20, 2011).
Non-Final Office Action, U.S. Appl. No. 12/727,726, mailed Sep. 16, 2011.
Non-Final Office Action, U.S. Appl. No. 13/166,378, mailed Sep. 19, 2011.
Non-Final Office Action, U.S. Appl. No. 12/914,209, mailed Sep. 20, 2011.
Non-Final Office Action, U.S. Appl. No. 13/166,542, mailed Sep. 16, 2011.
Omco Solar Brochure (Available at least as early as Oct. 20, 2011).
"Orion Solar Racking Jupiter Series Ground Mount System" Brochure, Orion Solar Racking (Available at least as early as Oct. 20, 2011).
"Phono Solar Tigo Energy Smart Module" Brochure, Phono Solar Technology Co., Ltd. (Available at least as early as Oct. 20, 2011).
"Polar Racking PolaRail Flush Mount Racking System" Brochure, Polar Racking Inc. Brochure, Schletter Inc. (Available at least as early as Oct. 20, 2011).
"PowAR Grip Product Sheet", A Raymond Tinnerman Industrial, Inc. (Available at least as early as Oct. 20, 2011).
Product Advertisement, "Alpine Snowguards/Setting the Industry Standard/Snow Guards for Every Roof Type" Mar. 27, 2000.
Product Advertisement, "Speedstand", Contractors Guide, Jun. 2000.
Product Description—"An Innovative Approach to Zero Roof Penetrations", Portable, Pipe Hangers, Inc., printed Jul. 2000.
Product Description—"Gecko-An Introduction", Gecko Safety Systems, Fall Arrest Protection, printed Jul. 2000.
Product Description—"Instruction and Specification Manual, Super Anchor: Fall Arrest Anchor. ARS-2.times.8 and ARS-2.times.12", 1993.
Product Description—"Super Anchor: Instruction/Specification Manual: Stainless Steel Fall Arrest Anchors ARS 2. times.8, ARS 2.times.12, I-Joist, Moveable ARS, Vertical Wall Anchor, and Custom Anchor", Mar. 2000.
Product Description—Anchor Guardrails, printed Aug. 2000.
Product Description—Gecko-An Introduction, Gecko Safety Systems, Ltd., printed Mar. 2000.
Product Description—Portable Pipe Hangers, Inc., Inter517face, Jun. 2000.
Product Description—Portable Pipe Hangers, printed Aug. 2000.
Professional Solar Products Inc., Fast Jack, available at least as early as Jan. 9, 2009.
Professional Solar Products Inc., FastJack Commercial Fast Jack, Commercial Leveling Kit, Comparison Chart for the Fast Jack, available at least as early as Jan. 9, 2009.
Professional Solar Products Inc., FastJack Installation Manual, modified Sep. 10, 2007.
Professional Solar Products Inc., FastJack Leveling Kits, available at least as early as Jan. 9, 2009.

"Prysmian Cables & Systems Photovoltaic (PV) System Products" Product Sample and Brochure, Prysmian Power Cables and Systems USA, LLC (Available at least as early as Oct. 20, 2011).
"Quick Mount PV" Brochure (Available at least as early as Oct. 20, 2011).
Quickscrews International Corporation brochure (Available at least as early as Jun. 29, 2011).
"Rapid2+ Clamp Product Sheet", Schletter Inc. (Available at least as early as Oct. 20, 2011).
"S-5! CorruBracket" Brochure, Metal Roof Innovations, Ltd. (Available at least as early as Oct. 20, 2011).
S-5! Dirimak Brochure (Available at least as early as Jul. 18, 2011).
S-5! Dirimak Product Photographs (Available at least as early as Jul. 18, 2011).
"S-5! S-5-U and S-5-U Mini" Brochure, Metal Roof Innovations, Ltd. (Available at least as early as Oct. 20, 2011).
"S-5! VersaBracket" Brochure, Metal Roof Innovations, Ltd. (Available at least as early as Oct. 20, 2011).
"Schletter Professional Solar Mounting Systems Mounting and Project Planning" Brochure, Schletter Inc. (Available at least as early as Oct. 20, 2011).
"Solar Power International 11 SPI Daily News—Thursday, Oct. 20, 2011" Solar Power International 2011 (Oct. 20, 2011).
"Solar Security Fasteners" Brochure, Duncan Solar (Available at least as early as Oct. 20, 2011).
"Sunmodo EZ Roof Mount Installation Guide" (Available at least as early as Oct. 20, 2011).
"Sunmodo EZ Roof Mount L Foot for Shingle Roofs" Brochure (Available at least as early as Oct. 20, 2011).
"Sunmodo EZ Mount Standoff for Metal Roofs" Brochure (Available at least as early as Oct. 20, 2011).
"Sunmodo EZ Roof Mount Standoff for Shingle Roofs" Brochure (Available at least as early as Oct. 20, 2011).
MacDonald, "Inspecting the Scaffold" and Protective Roofing Products Ltd. advertisement, (available at least as early as Oct. 20, 2011), Roofing Contractor 6.00.
Product Advertisement—Sarna, Sarnafil Division (available at least as early as Oct. 20, 2011).
Product Description—"Flat Roof Safety System", POHL Roof and Safety Systems,Securant (available at least as early as Oct. 20, 2011).
Product Description—FLUX-Boy (available at least as early as Oct. 20, 2011).
"Advanced Roof Protection" PANELCLAW, (available at least as early as Feb. 16, 2012), 2 pages.
"CENIQ, Mounting instructions" Instruction Manual, CENTROSOLAR AG, (Oct. 2011), 28 pages.
"Dura-Blok™, A Complete Rooftop Support Solution" brochure, Cooper Industries, PLC, (2010), 16 pages.
"Lightning Rod" drawing sheet, Sika Corporation, (Apr. 2010), 1 page.
"Lightning Rod at Deck Level" drawing sheet, Thermoplastic Universal, (2012), 1 page.
"Lightning Rod at Deck Level With SecurTape" drawing sheet, Thermoplastic Universal, (2011), 1 page.
"Lightning Rod at Parapet (Vertical Attachment)" drawing sheet, Thermoplastic Universal, (2012), 1 page.
"Lightning Rod Detail" drawing sheet, Duro-Last, (1998), 1 page.
"Nobody Covers You Better" drawing sheets, Firestone Building Products, (Jan. 1, 2006), 6 pages.
"Rooftop Mount" Daetwyler Clean Energy ECO-Top™, (2011-2012), 3 pages.
"Scirocco—an innovative solution for low impact and low ballast flat-roof PV installation" brochure, Sloar Canada Inc. (2010-2011), 2 pages.
"Solar" borchure, Lauren Manufacturing, (available at least as early as Feb. 16, 2012), 2 pages.
"Sunrail Flat Roof Mounting System" brochure, Opsun Technologies, Inc. (2011), 2 pages.
"Zilla Racking & Mounting Components" Zilla Corporation, (available at least as early as Jun. 8, 2009), 4 pages.
International Search Report and Written Opinion for Application No. PCT/US2012/033764 dated Oct. 10, 2012 (8 pages).

(56) References Cited

OTHER PUBLICATIONS

Office Action from the United States Patent and Trademark Office for U.S. Appl. No. 13/270,385 dated Mar. 26, 2012 (7 pages).
Office Action from the United States Patent and Trademark Office for U.S. Appl. No. 13/270,792 dated Apr. 16, 2012 (10 pages).
Office Action from the United States Patent and Trademark Office for U.S. Appl. No. 13/271,650 dated Apr. 23, 2012 (13 pages).
Office Action from the United States Patent and Trademark Office for U.S. Appl. No. 13/271,650 dated Jul. 25, 2012 (12 pages).
Office Action from the United States Patent and Trademark Office for U.S. Appl. No. 13/272,938 dated Apr. 23, 2012 (11 pages).
Office Action from the United States Trademark and Patent Office for U.S. Appl. No. 13/272,938 dated Jul. 26, 2012 (8 pages).
Office Action from United States Patent and Trademark Office for U.S. Appl. No. 12/914,209 dated Jan. 27, 2012, 5 pages.
Office Action from United States Patent and Trademark Office for U.S. Appl. No. 12/727,726 dated Jan. 4, 2012, 5 pages.
Office Action from United States Patent and Trademark Office for U.S. Appl. No. 13/270,385 dated Dec. 23, 2011, 7 pages.
Office Action from United States Patent and Trademark Office for U.S. Appl. No. 13/270,419 dated Dec. 22, 2011, 7 pages.
Office Action from United States Patent and Trademark Office for U.S. Appl. No. 13/271,633 dated Dec. 5, 2011, 7 pages.
Office Action from United States Patent and Trademark Office for U.S. Appl. No. 13/272,938 dated Dec. 22, 2011, 9 pages.
Office Action from the United States Patent and Trademark Office for U.S. Appl. No. 13/272,005 dated Nov. 14, 2012 (24 pages).
International Search Report and Written Opinion for Application No. PCT/US2012/027798 dated Sep. 27, 2012 (8 pages).
International Preliminary Report on Patentability for Application No. PCT/US2012/027798 dated Sep. 26, 2013 (7 pages).

\* cited by examiner

ROOF MOUNT HAVING BUILT-IN FAILURE

CROSS-REFERENCE TO RELATED APPLICATIONS

This application claims the benefit of and priority to U.S. Provisional Patent Application No. 61/505,670, filed Jul. 8, 2011, the entire contents of which are hereby incorporated by reference herein.

FIELD OF THE INVENTION

The present invention relates to roof mounting structures and methods of designing and installing the same.

SUMMARY

In some embodiments, the invention provides a roof attachment assembly to be mounted on a roof substrate. The roof attachment assembly comprises a plate having a substantially frustoconical protrusion, the plate defining a first surface and a second surface and including an aperture extending through the frustoconical protrusion between the first and second surfaces, the first surface facing the roof substrate and the second surface spaced from the roof substrate. The roof attachment assembly further comprises a first membrane positioned adjacent to the first surface of the plate, a second membrane positioned adjacent to the second surface of the plate, a bracket positioned proximate the second membrane and the second surface of the plate, the bracket operable to support one or more roof-mounted fixtures, and a fastener extending through the bracket, the membranes, and the plate, the fastener operable to couple the bracket, the membranes and the plate. The roof attachment assembly also comprises a second fastener that substantially mates with the bracket, wherein at least one of the fastener, the plate, the first membrane, and the second fastener includes at least one pre-determined breaking point.

In other embodiments, the invention provides a roof attachment assembly to be mounted on a roof substrate. The roof attachment assembly comprises a first plate having a substantially frustoconical protrusion defining an aperture extending therethrough, the plate defining a first surface and a second surface, the first surface facing the roof substrate and the second surface spaced from the roof substrate. The roof attachment assembly also comprises a membrane positioned adjacent one of the first surface and the second surface of the first plate, a second plate positioned adjacent to the roof substrate and having a recess defining a second aperture, the second plate defining a top surface spaced from the roof substrate, a second membrane positioned adjacent to the top surface of the second plate, a bracket positioned proximate to the membrane and the second surface of the first plate, the bracket operable to support one or more roof mounted fixtures, and a fastener extending through and coupling the bracket, the membrane, and the first plate. The roof attachment assembly further comprises a second fastener that substantially mates with the bracket, and a third fastener extending through and coupling the second plate and the roof substrate, wherein at least one of the fastener, the first plate, the membrane, and the second fastener includes at least one pre-determined breaking point.

In other embodiments, the invention provides a roof attachment assembly to be mounted on a roof substrate. The roof attachment assembly comprises a base member having a substantially frustoconical protrusion extending away from the roof substrate along an axis and defining an aperture extending along the axis, the base member defining a first surface and a second surface, the first surface facing the roof substrate and the second surface spaced from the roof substrate. The roof attachment assembly also comprises a membrane positioned adjacent one of the first surface and the second surface of the base member, the membrane defining a second aperture substantially aligned with the first aperture, such that the second aperture extends along the axis. The roof attachment assembly further comprises a bracket positioned proximate the membrane and the second surface of the base member, the bracket defining a first recess, a second recess, and a bracket aperture extending between the first recess and the second recess, the bracket operable to support at least one roof-mounted assembly, the bracket aperture substantially aligned with the first aperture and the second aperture, such the bracket aperture extends along the axis. The roof attachment assembly further comprises a fastener extending through the bracket, the membrane, and the base member, the fastener operable to couple the bracket, the membranes and the base member, and a second fastener that substantially mates with the bracket, wherein at least one of the fastener, the base member, the membrane, and the second fastener includes at least one pre-determined breaking point.

In other embodiments, the invention provides a roof attachment assembly to be mounted on a roof substrate. The roof attachment assembly comprises a first membrane supportable on the roof substrate, a base member that defines a first surface positioned substantially adjacent the first membrane and a second surface spaced from the roof substrate and the first membrane, the base member defining a surface area, the base member including a frustoconical protrusion extending away from the roof substrate along an axis. The first surface forms a frustoconical recess and the second surface forms the frustoconical protrusion, the base member defines a first aperture extending along the axis from the first surface to the second surface, the first aperture substantially centrally positioned in the frustoconical protrusion. The roof attachment assembly also comprises a second membrane coupled to the first membrane and coupled to the base member, the second membrane positioned substantially adjacent the base member second surface, the second membrane defining a surface area, wherein the second membrane surface area is greater than the surface area of the base member. The second membrane is deformable to substantially conform to the frustoconical protrusion of the base member, the second membrane defining a second aperture extending therethrough, the second aperture being substantially aligned with the first aperture, such that the second aperture extends along the axis. The roof attachment assembly further comprises a fastener oriented along the axis, the fastener extending through the first aperture and the second aperture to couple the base member to the second membrane, wherein at least one of the fastener, the base member, and the second membrane includes at least one pre-determined breaking point.

In other embodiments, the invention provides a roof attachment assembly to be mounted on a roof substrate. The roof attachment assembly comprises a base member supportable on the roof substrate, the base member defines a first surface positioned substantially adjacent the roof substrate and a second surface spaced from the roof substrate. The base member defines a surface area and includes a frustoconical protrusion extending away from the roof substrate along an axis, the first surface forms a frustoconical recess and the second surface forms the frustoconical protrusion. The base member defines a first aperture extending along the axis from the first surface to the second surface, the first aperture substantially centrally positioned in the frustoconical protrusion.

The roof attachment assembly also comprises a membrane positioned substantially adjacent the base member second surface, the membrane defining a surface area, wherein the membrane surface area is greater than the surface area of the base member. The membrane is deformable to substantially conform to the frustoconical protrusion of the base member, the membrane defining a second aperture extending therethrough, the second aperture being substantially aligned with the first aperture, such that the second aperture extends along the axis. The roof attachment assembly further comprises a fastener oriented along the axis, the fastener extending through the first aperture and the second aperture to couple the base member to the membrane, wherein at least one of the fastener, the base member, and the membrane includes at least one pre-determined breaking point.

In other embodiments, the invention provides a roof attachment assembly to be mounted on a roof substrate. The roof attachment assembly comprises a first membrane supportable on the roof substrate, and a base member that defines a first surface positioned substantially adjacent the first membrane and a second surface spaced from the roof substrate and the first membrane. The base member defines a surface area and includes a frustoconical protrusion extending away from the roof substrate along an axis. The first surface forms a frustoconical recess and the second surface forms the frustoconical protrusion, the base member defines a first aperture extending along the axis from the first surface to the second surface, the first aperture substantially centrally positioned in the frustoconical protrusion. The roof attachment assembly also comprises a second membrane coupled to the first membrane and coupled to the base member, the second membrane positioned substantially adjacent the base member second surface. The second membrane defines a surface area, wherein the second membrane surface area is greater than the surface area of the base member. The second membrane is deformable to substantially conform to the frustoconical protrusion of the base member, the second membrane defining a second aperture extending therethrough, the second aperture being substantially aligned with the first aperture, such that the second aperture extends along the axis. The roof attachment assembly further comprises a bracket coupled to the second membrane, the bracket defining a first surface spaced from the second membrane and a second surface positioned substantially adjacent the second membrane, the bracket defining an aperture extending from the first surface to the second surface. The bracket is operable to support a roof-mounted assembly, and the bracket aperture is substantially aligned with the first aperture and the second aperture, such the bracket aperture extends along the axis. The roof attachment assembly further comprises a fastener oriented along the axis, the fastener extending through the first aperture, the second aperture and the bracket aperture to couple the base member to the second membrane and to the bracket, wherein at least one of the fastener, the base member, and the second membrane includes at least one pre-determined breaking point.

In other embodiments, the invention provides a roof attachment assembly to be mounted on a roof substrate. The roof attachment assembly comprises a base member positioned adjacent to the roof substrate, the base member having a substantially frustoconical protrusion extending away from the roof substrate and defining an aperture, the base member defining a first surface and a second surface, the first surface facing the roof substrate and the second surface spaced from the roof substrate. The roof attachment assembly also comprises a first membrane positioned adjacent the second surface of the base member, the membrane defining a second aperture substantially aligned with the first aperture, and a second membrane positioned adjacent the first membrane, the second membrane defining a third aperture substantially aligned with the first aperture and the second aperture. The roof attachment assembly further comprises a fastener extending through the base member and the first membrane, the fastener operable to engage a supporting element extending through the third aperture, wherein at least one of the fastener, the base member, and the first membrane includes at least one pre-determined breaking point.

Other aspects of the invention will become apparent by consideration of the detailed description and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," etc.) are only used to simplify description of embodiments of the present invention and do not alone indicate or imply that the device or element referred to must have a particular orientation. In addition, terms such as "first" and "second" are used herein for purposes of description and are not intended to indicate or imply relative importance or significance.

Figure 1:
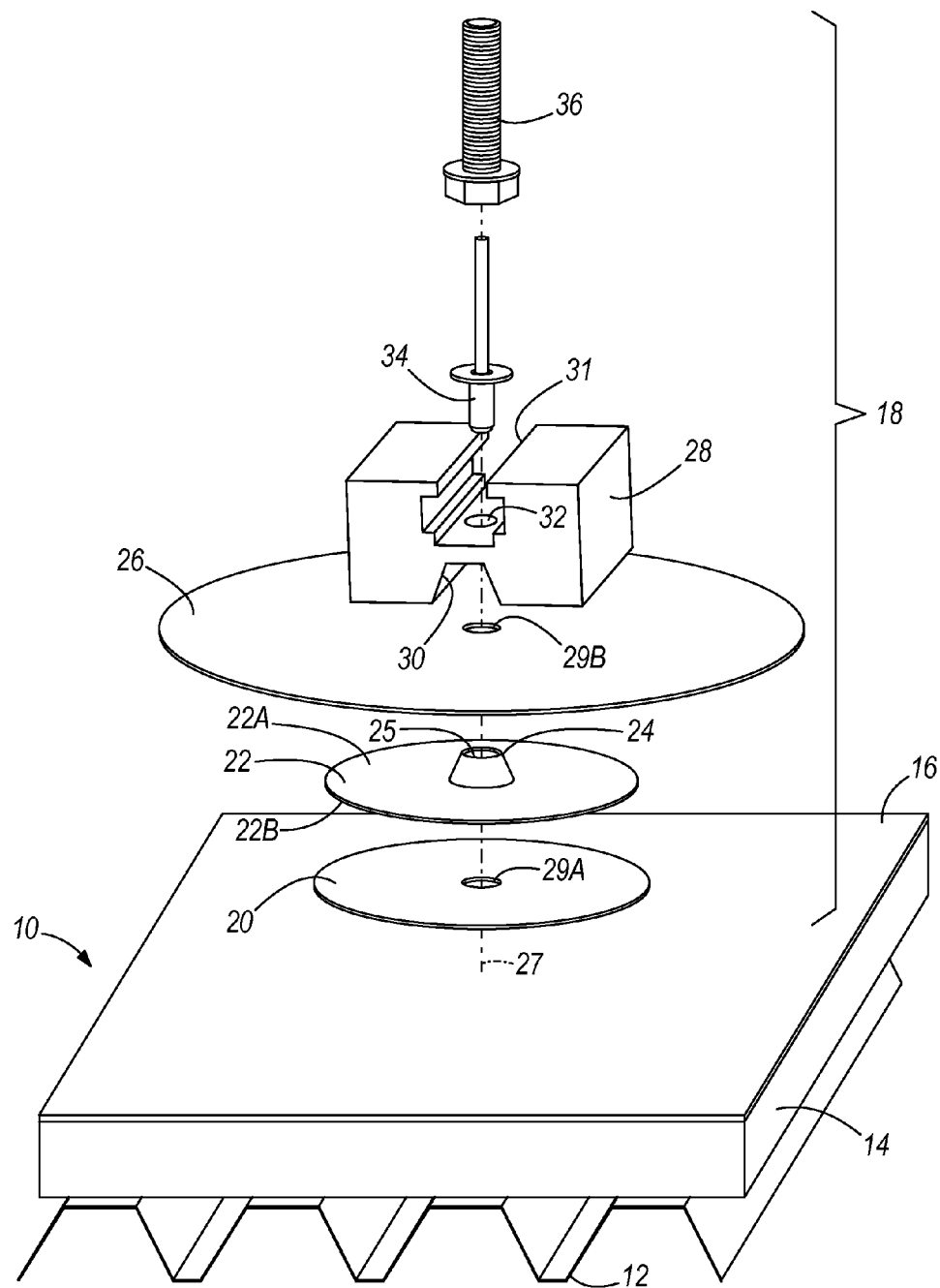
FIG. 1 is an exploded view of a roofing system with a roof attachment assembly according to an embodiment of the present invention.
Figure 2:
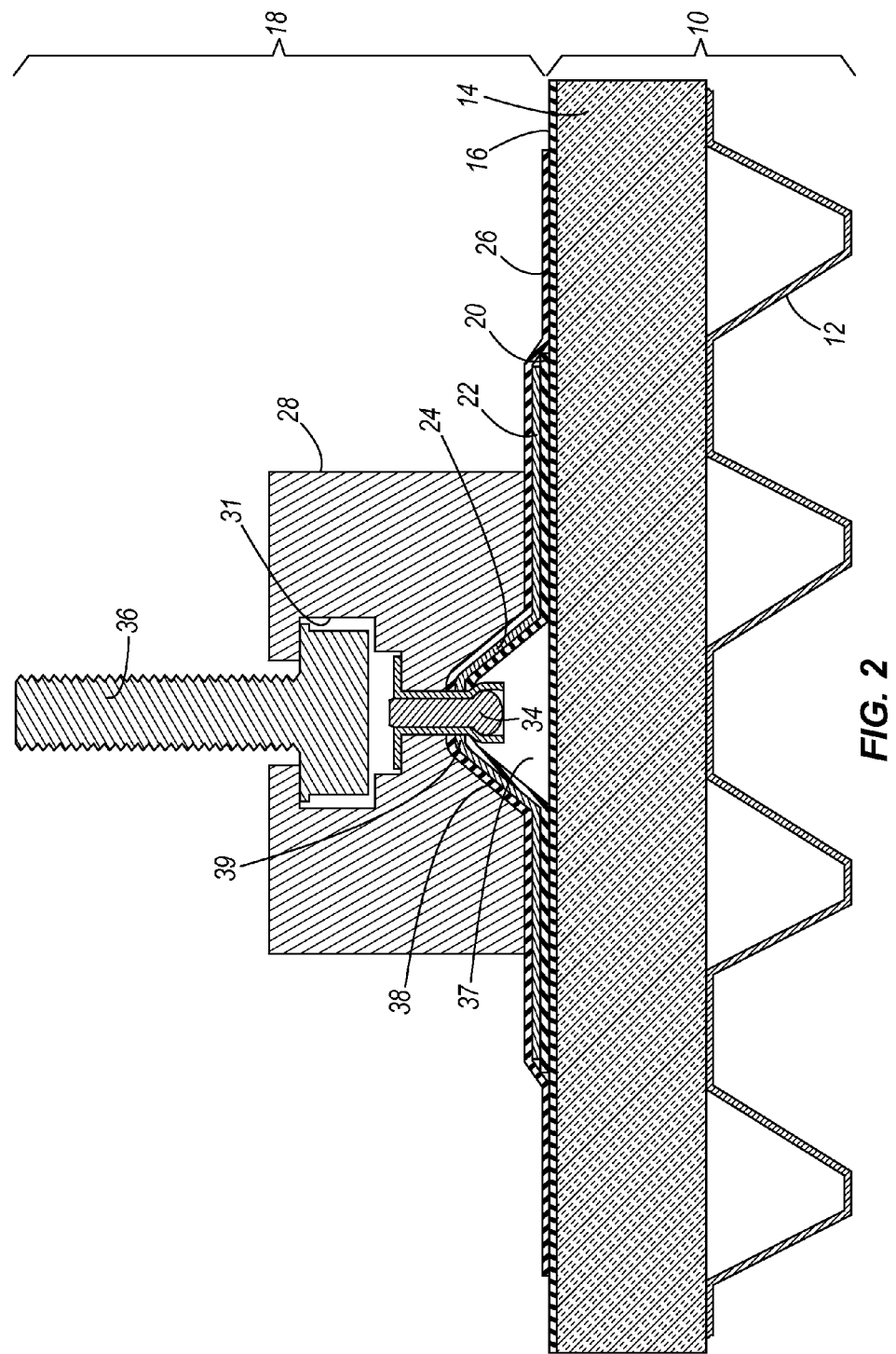
FIG. 2 is a cross-sectional view the roofing system and the roof attachment assembly of FIG. 1.

FIGS. 1 and 2 illustrate a roofing system 10 including a metal roof deck 12, a roof substrate 14 (e.g., insulation, tarpaper, plywood or other decking material, and the like) supported on the roof deck 12, a membrane 16 extending across the substrate 14 (i.e., placed immediately adjacent an upper surface of the substrate 14 or supported on one or more intermediate layers of roofing or sealing material, which in turn are placed on the substrate 14). The roofing system 10 can be utilized on any of a variety of roof types, such as slate roofs, membrane roofs, aluminum roofs, standing seam roofs, tile roofs, shingle roofs, and the like.

The roofing system 10 is operable to support any of a variety of roof-mounted fixtures, such as, for example, snow fences, solar panels, conduit for solar panels, cables for lighting rods, an antenna, signs, billboards, or any of a number of other roof-mountable assemblies. Depending on one or more of the geographic location, anticipated quantity and type of precipitation, and anticipated roof and wind loading, the roofing system 10 can include any of a variety of flashing, seal and bracket arrangements, as will be discussed below.

A roof attachment assembly 18 can be coupled to the roofing system 10 with few or no fasteners extending through the membrane 16. One such roof attachment assembly 18 is illustrated in FIGS. 1 and 2 and includes a first membrane pad 20, a plate 22 having a substantially frustoconical protrusion 24, a second membrane pad 26, a bracket 28 having a first recess 30, a second recess 31 and an aperture 32 extending between the first recess 30 and the second recess 31, a rivet 34, and a bolt 36. The rivet 34 extends through the first membrane pad 20, the frustoconical protrusion 24 of the plate 22, the second membrane pad 26, and into the aperture 32 of the bracket 28. The bolt 36 has a head that substantially mates with the second recess 31 of the bracket 28.

Although the illustrated roof attachment assembly 18 is substantially circular, other shapes are possible. For example, the roof attachment assembly 18 can be square, ovular, round, rectangular, triangular, pentagonal or other regular or non-regular shape.

In some embodiments, the plate 22 can include one or more stiffening ribs or flanges to increase rigidity. The plate 22 has a top surface 22A facing the second membrane pad 26 and a bottom surface 22B facing the first membrane pad 20. In other words, the bottom surface 22B of the plate faces the roof substrate and the top surface 22A is spaced from the roof substrate. In some embodiments, the top surface 22A and/or the bottom surface 22B is coated with a material similar to the roof material, such as a membranous material. Embodiments in which both the top surface 22A and the bottom surface 22B are coated can omit one or more of the first membrane pad 20 and the second membrane pad 26.

The illustrated plate 22 is substantially circular, but the plate can be other regular or non-regular shapes. The illustrated plate 22 is metallic, but is other embodiments the plate is polymeric. In some embodiments, the plate 22 is frangible at a pre-determined force.

The plate 22 extends substantially along a plane. The frustoconical protrusion 24 of the plate 22 extends away from the roof substrate 14 and defines an aperture 25 extending along an axis 27. The aperture 25 is circular, but in other embodiments, can have other regular or irregular shapes. The illustrated aperture 25 is substantially centered on the upwardly extending protrusion 24, but other, non-centered embodiments are possible. The frustoconical protrusion 24 has a diameter in the plane, and the aperture 25 has diameter in a second plane that is substantially parallel to but spaced from the plane. The diameter of the aperture 25 is less than the diameter of the protrusion 24, to form a truncated cone or frustoconical shape. In other embodiments, the protrusion 24 can have other shapes and configurations, corresponding to the shape of an underside of the associated bracket 28.

As best illustrated in FIG. 2, the protrusion 24 defines a concave interior side 37, an exterior side 38 and a frustoconical end 39. As used herein, frustoconical includes cones with rounded, flat, non-flat or nearly flat upper portions and truncated cones with rounded, flat, non-flat or nearly flat upper portions. The illustrated upwardly extending protrusion 24 is circular, but in other embodiments, can be square, D-shaped, triangular, pentagonal, hexagonal, ovular, or other regular or irregular shapes. Similarly, in some embodiments, the concave interior side 37 of the protrusion 24 may have a number of different shapes and configurations, including but not limited to configurations in which the arch provided by the interior side 37 does not include a uniform radius.

The first membrane 20 and the second membrane 26 have substantially circular shapes, but other shapes of these membranes are possible. In the illustrated embodiment, the diameter of the second membrane 26 is larger than the diameter of the first membrane 20, but in other embodiments the membranes 20 and 26 can have different diameters. The first membrane 20 is positioned adjacent to the bottom surface 22B of the plate 20, and the second membrane 26 is positioned adjacent to the top surface 22A of the plate 22. The first membrane 20 and the second membrane 26 include corresponding apertures 29A and 29B. The apertures 29A and 29B of the membranes 20 and 29 are substantially aligned with the aperture 25 of the plate 22, such that that the apertures 29A and 29B extend along the axis 27. The bracket aperture 32 is substantially aligned with the plate aperture 25 and the apertures 29A and 29B of the membranes 20 and 29, such that that the bracket apertures 32 also extends along the axis 27.

The bracket 28 is configured to be coupled to the second membrane 26 and is operable to support one or more roof mounted fixtures. The bracket 28 illustrated in FIGS. 1-3. is substantially rectangular, but a square, a circle, or other shaped and sized bracket having a frustoconical aperture can be utilized. The illustrated first recess 30 of the bracket 28 is substantially frustoconical and matingly receives the frustoconical protrusion 24 at least partially therein. The frustoconical protrusion 24 can substantially match the shape of the first recess 30. In the illustrated embodiment, the second recess 31 of the bracket 28 is sized to engage the head of the bolt 36 to inhibit rotation of the bolt 36 within the second recess 31. The bracket aperture 32 is substantially circular, but other shapes, such as ovular, square, rectangular, hexagonal, and the like are possible. The aperture 32 is sized to receive the rivet 34 or any fastener, protrusion, or the like therethrough. The circular shape of the aperture 32 permits flexibility and slight relative movement between the bracket 28 and the rivet 34, fastener, projection or the like, when installed.

In some embodiments, the plate 22 and the rivet 34 are connected to inhibit rotation of the rivet 34 with respect to the plate 22. The plate 22 and the rivet 34 can be connected by spot welding, heat welding, forging, indenting the threads with pins or other projections, double-sided tape or other adhesive, or other permanent or semi-permanent connection. In some embodiments, the bracket 28 and the bolt 36 are connected to inhibit rotation of the bolt 36 with respect to the bracket 28. The bracket 28 and the bolt 36 can be connected by spot welding, heat welding, forging, indenting the threads with pins or other projections, double-sided tape or other adhesive, or other permanent or semi-permanent connection.

Figure 3:
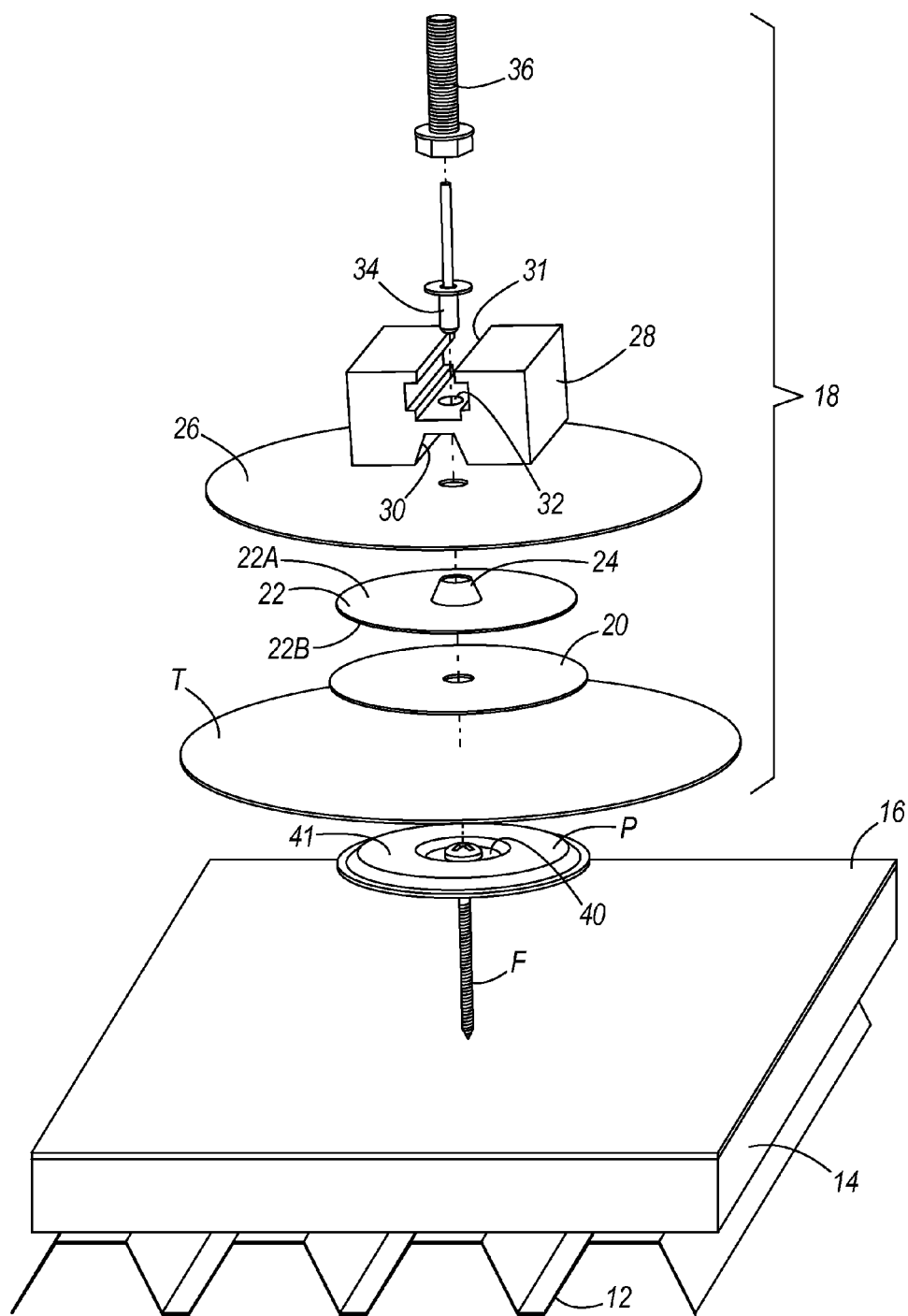
FIG. 3 is an exploded view of an alternative embodiment of the roof attachment assembly of FIG. 1.

The roof attachment assembly 18 can be coupled to the roofing system 10 with any suitable non-penetrating fastening method, such as welding, adhering, gluing, bonding, and the like. The roof attachment assembly 18 can be coupled directly to the roof membrane 16 (as shown in FIGS. 1 and 2) or can be coupled to a target patch T positioned on the roof membrane 16 of the roof substrate 14 (as shown in FIG. 3). As illustrated in FIG. 3, the roof attachment assembly 18 can be coupled to the roofing system above the target patch T (also known as a membrane or a flashing) and a plate P that is secured by a roof-penetrating fastener F.

The plate P is substantially circular, but the plate P can be other regular or non-regular shapes. The plate P defines a counterbore or recess 40 that is configured to accept the fastener F. The plate P defines a top surface 41 spaced from the roof membrane 16 and the roof substrate 14. One of the sides of the target patch T is adjacent to the top surface 41 of the plate P, and the other side of the target patch T is adjacent to the first membrane 20. The illustrated embodiment includes a RhinoBond® plate P and fastener F, but other plates, fasteners and other roof mounting structures can be utilized. In the embodiment shown in FIG. 3, the diameter of the target patch T is substantially larger than the diameter of the plate P. However, in other embodiments, the target patch T and the plate P can have different diameters. The fastener F can be a bolt, a screw, or any other suitable fastener that allows that plate P to be securely coupled to the roof substrate 14. The target patch T seals any penetrations caused by the fastener F.

The roof attachment assembly 18 is operable to support any of a variety of roof-mounted fixtures, such as snow guards, snow fences, solar panels, conduit for solar panels, cables for lighting rods, an antenna, signs, billboards, or any other assembly mountable to a roof. Some roof-mounted fixtures are described in detail in commonly-assigned U.S. Pat. No. 5,609,326, filed Jun. 16, 1995, and U.S. Pat. No. 6,526,701, filed Dec. 6, 2000, the contents of both of which are herein incorporated by reference. Some suitable brackets that are coupleable to the roof attachment assembly 18 are described in detail in commonly-assigned U.S. Patent Application Publication 2011/0120047, filed Oct. 28, 2010, the contents of which are herein incorporated by reference.

In some embodiments that omit the first membrane pad 20, the second membrane pad 26 is welded, glued or otherwise adhered to the membrane 16 only around a perimeter of the first membrane pad 20. In other embodiments that omit the first membrane pad 20, the plate 22 is coated on the top surface 22A and/or the bottom surface 22B with a membranous material, an adhesive. In some embodiments, an adhesive, such as double-sided tape or a double-sided Rhino-Bond® plate is connected to the bottom surface 22B, to adhere the plate 22 directly to the membrane 16.

In some embodiments, any suitable frangible fastener, other than the rivet 34 can be utilized in the roof attachment assembly 18. The term "frangible fastener" is used herein to describe any fastener having a reasonably predictable and controllable failure load and/or location with respect to the fastener and the fastening system. These fasteners may or may not be threaded. In some embodiments, pins or other protrusions can be used to fix the bracket 28 to the fastener.

The roof attachment assembly 18 is separable from the roofing system 10 if a significant separation force and/or torque is applied to the roof attachment assembly 18. In the currently existing roof mounting systems, when the roof attachment assembly 18 separates from the roofing system 10, the roofing is often damaged. Therefore, it is desirable to design a roof attachment assembly that includes at least one designed built-in failure (i.e., one or more pre-determined breaking points). The at least one built-in failure is designed to fail prior to damaging the roofing system 10. Many prior art systems design the roof mount to be as unbreakable as possible. However, roof manufacturers must approve of these roof mount assemblies otherwise, the roof warrantee is voided. Therefore, the present invention provides at least one built-in failure including at least one component of the roof attachment assembly 18. This component of the roof attachment assembly 18 is designed to fail prior to a failure that may damage the roofing system 10.

A first built-in failure in the roof attachment assembly 18 is a frangible fastener, such as the illustrated rivet 34. In some embodiments, the rivet 34 is a blind rivet, such as a POP® rivet manufactured by Emhart® Teknologies. Such rivets can be installed by a user having access to only one side of the pieces to be joined and have predictable failure ratings (i.e., they fail under predetermined levels of force or torque applied to the rivet). In one embodiment, the rivet 34 can be configured to fail under less or significantly less force than is required to tear and/or separate the membranes 16 and 26. The rivet 34 can be configured to fail in one or more points of the body of the rivet. In that situation, the rivet 34 of the roof attachment assembly 18 will fail prior to a failure of the membranes 16 or 26 that can damage the roofing system 10. As mentioned above, other frangible fasteners can be utilized in place of the illustrated rivet 34.

A second built-in failure in the roof attachment assembly 18 is the plate 22. The illustrated plate 22 is metallic, so that failure of the illustrated plate 22 would include deformation of the plate 22 adjacent to the aperture 25 to permit the rivet 34 to separate from the plate 22. Therefore, in that embodiment, the pre-determined breaking point of the plate 22 is at the aperture 25. In other embodiments, the plate 22 is polymeric, so the plate 22 can also include one or more predetermined breaking points around a perimeter of the plate 22. Therefore, failure of the plate 22 could include cracking and/or other breaking of the plate 22 to permit the rivet 34 to separate from the plate 22.

A third built-in failure in the roof attachment assembly 18 is the second membrane 26. As previously described, the membrane 26 is positioned between the plate 22 and the bracket 28. In the illustrated embodiment, the membrane 26 defines a perimeter that is larger than the perimeter of the plate 22. The membrane 26 can tear (and thus, fail) if subjected to sufficient force by the plate 22 pulling against the membrane 26. The membrane 26 can tear at the central aperture 29B and/or around the perimeter of the plate 22. Therefore, the membrane 22 includes one or more predetermined breaking points at the aperture 29B and/or around the perimeter of the plate 22.

A fourth built-in failure in the roof attachment assembly 18 is the bolt 36. In one embodiment, the bolt 36 includes a predetermined breaking point between the head and the shaft of the bolt 36. In other embodiments, the bolt 36 can include more predetermined breaking points. Although not specifically illustrated, the bolt 36 can include a weakening or notch that is designed to fail if subjected to a sufficient force by the roof mounted apparatus pulling off of the bracket 28.

Failure of the weld between the membrane 16 and either of the membranes 20 and 26 is undesirable. Such failure of the weld can damage the roof 10, and therefore may require a patch or other repair work to assure the roof is suitably watertight. Therefore, it is desirable for at least one of the first, second, third, or fourth built-in failures to fail before the weld coupling the roof attachment assembly 18 to the roofing system 10 fails.

In one embodiment, only one of the above-identified built-in failures of the roof attachment assembly 18 fails at least one the pre-determined breaking point when a force or a torque upon these built-in failures exceeds a pre-determined force. In other embodiments, more than one of the built-in failures of the roof attachment assembly 18 fails. In further embodiments, all of the first, second, third and fourth built-in failures are designed to fail prior to failure of the weld. The built-in failures of the roof attachment assembly 18 can each have a different failure mode, such that one of the built-in failures fails from a pre-determined torque, another of the built-in failures fails from a pre-determined linear force, and still another of the built-in failures fails from a pre-determined shear force. In other words, the pre-determined force or torque required to fail each of the rivet 34, the plate 22, the membrane 26, and the bolt 26 is different.

Figure 4:
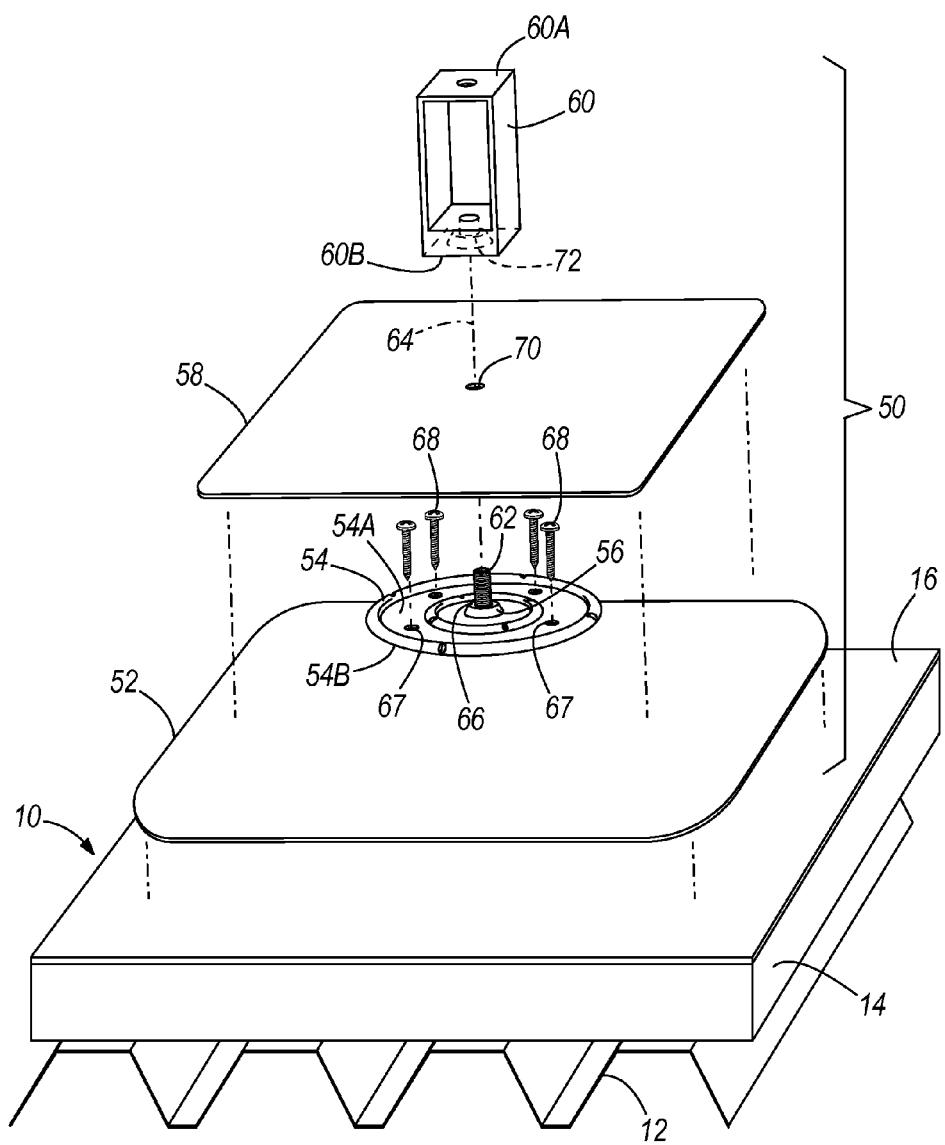
FIG. 4 is an exploded view of a roofing system with a roof attachment assembly according to another embodiment of the present invention.
Figure 5:
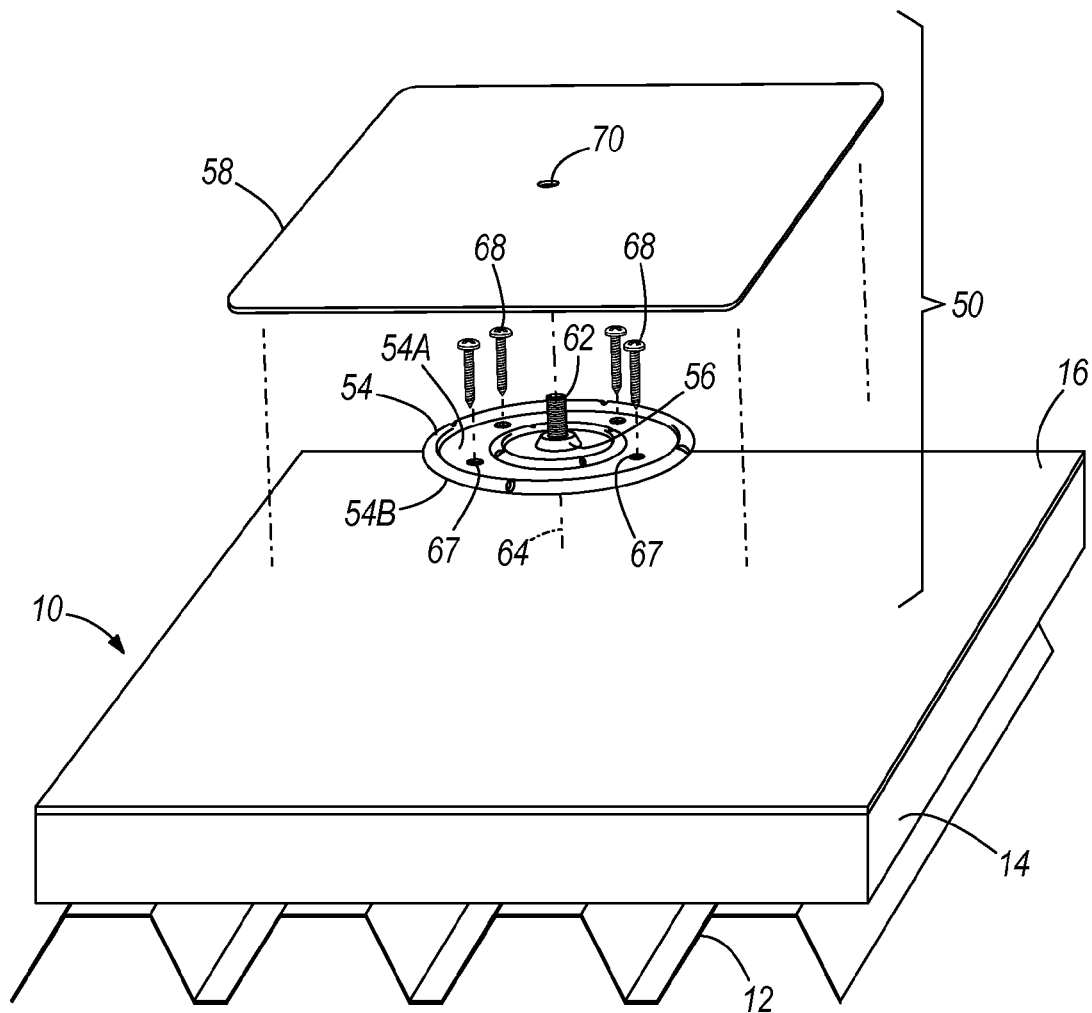
FIG. 5 is an exploded view of an alternative embodiment of the roofing system with the roof attachment assembly of FIG. 4.
Figure 6:
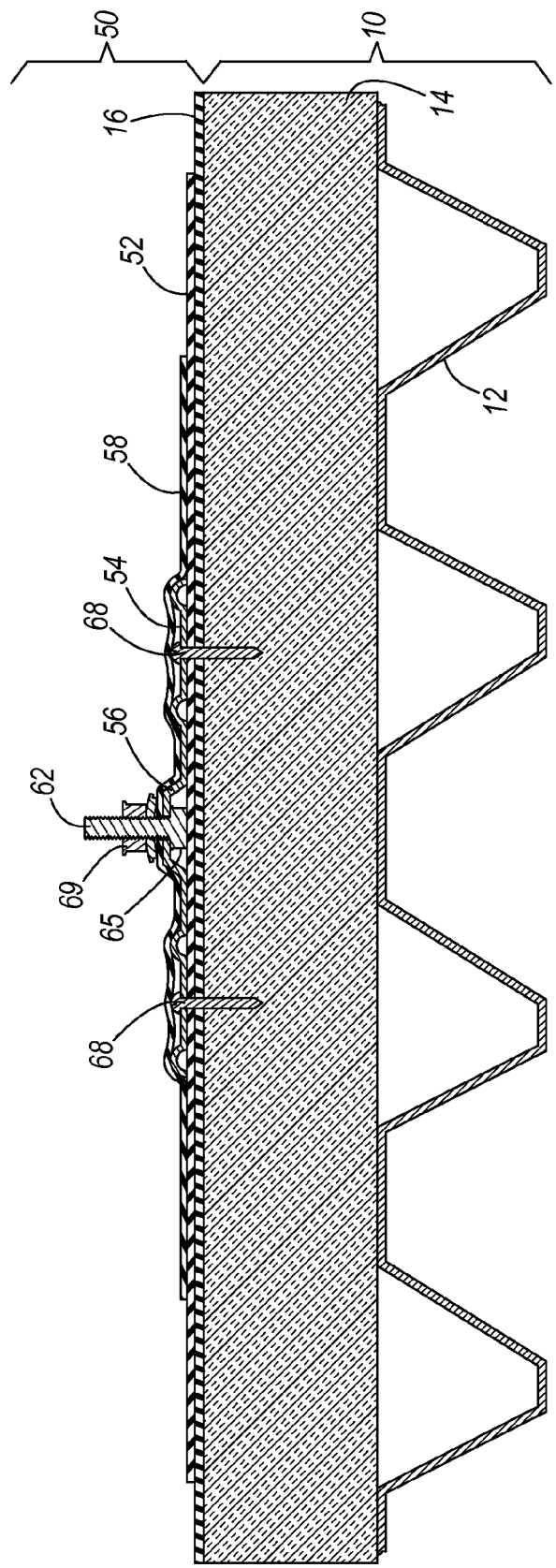
FIG. 6 is a cross-sectional view the roofing system and the roof attachment assembly of FIG. 4.
Figure 7:
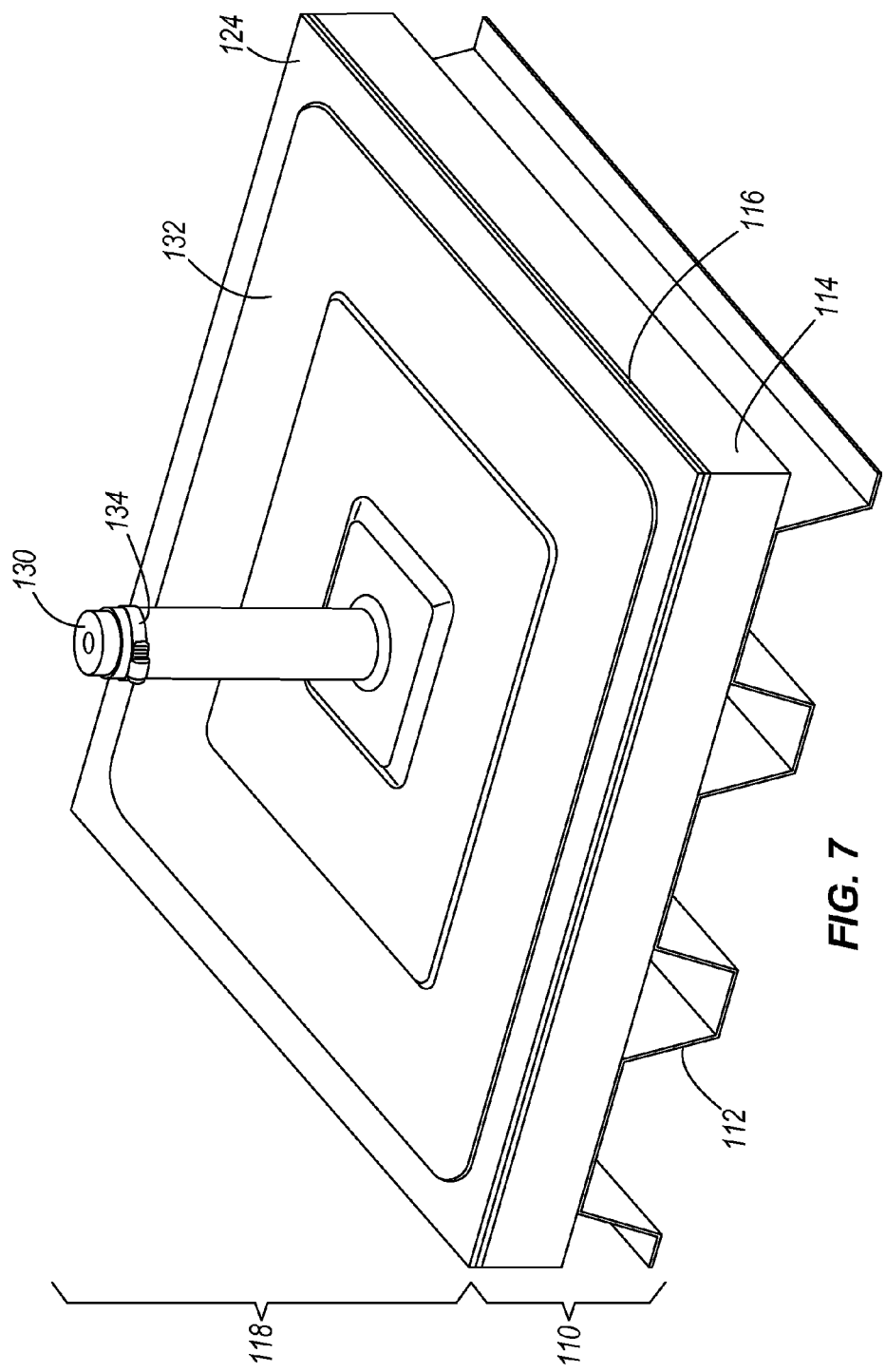
FIGS. 7-9 illustrate an alternative embodiment of a roofing system and a roof attachment assembly according to some embodiments of the present invention.
Figure 8:
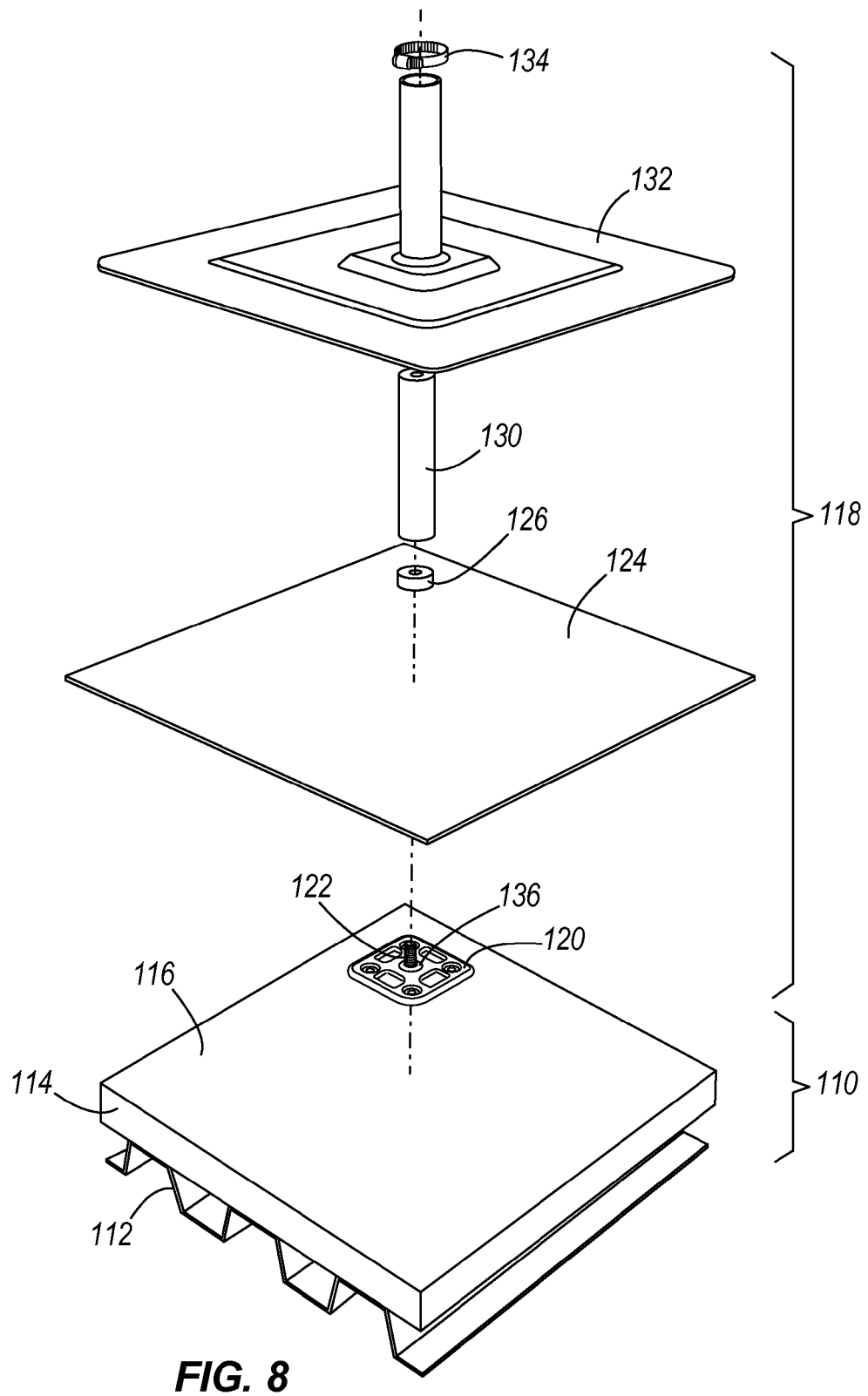
Figure 9:
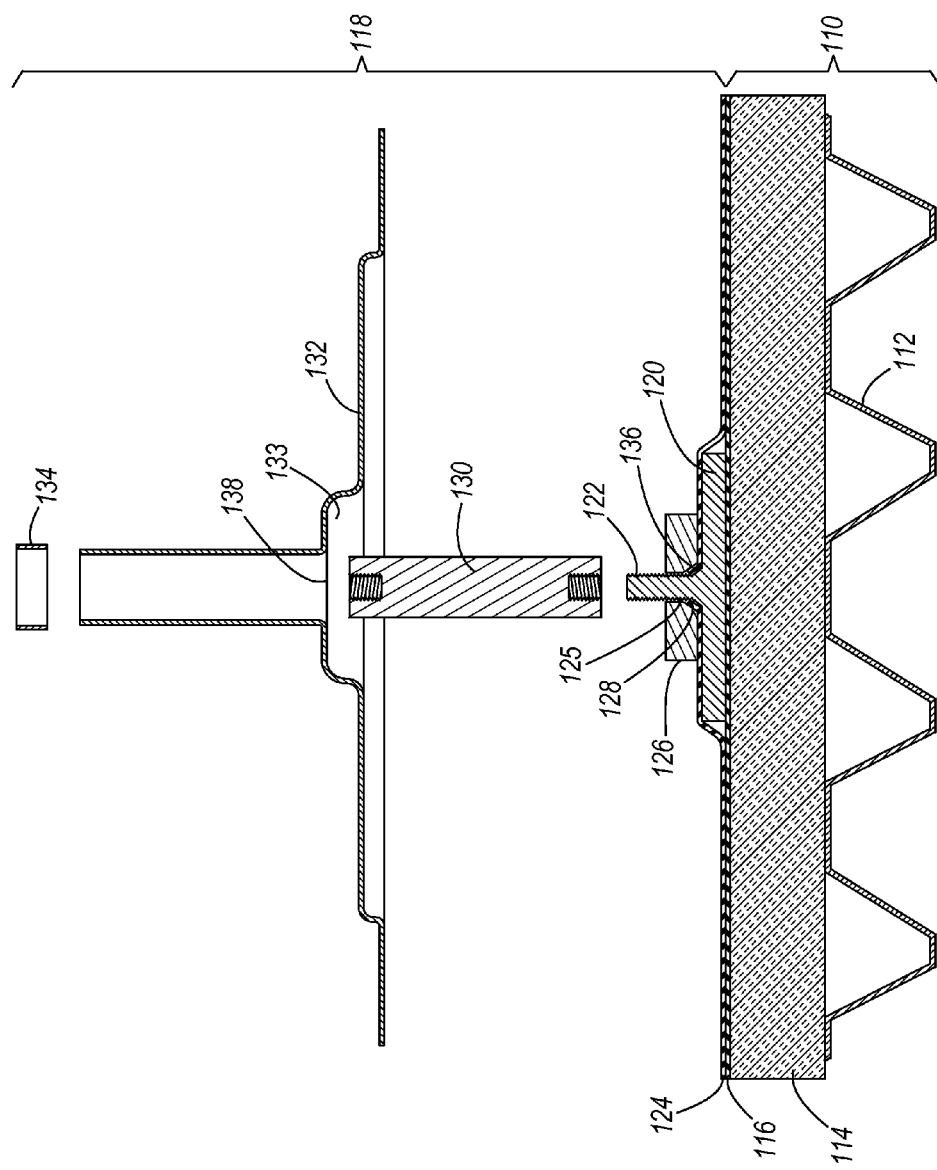
Figure 10:
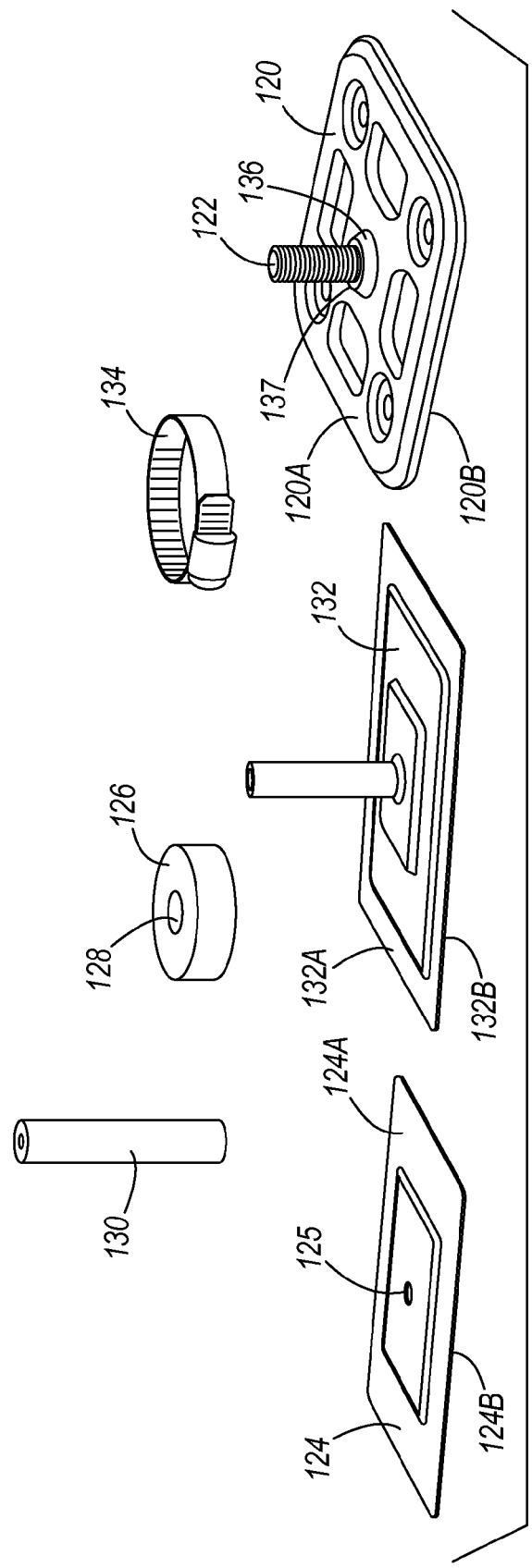
FIG. 10 illustrates the roof attachment assembly of FIGS. 7-9.

FIGS. 4-6 illustrate another construction of a roof attachment assembly 50 having a built-in failure. The roof attachment assembly 50 can be coupled to a roofing system 10, which is similar to the previously described roofing system 10 in FIGS. 1-3. Specifically, the roof attachment assembly 50 can be attached to a roofing substrate 14. The roof attachment assembly 50 includes a first membrane pad 52 supported on the roof substrate 16, a plate or a base member 54 having a substantially frustoconical protrusion 56, a second membrane pad 58, a bracket 60, and a fastener 60 (e.g., a bolt). The fastener 62 extends through the plate 54, the second membrane 58, and the bracket 60 to couple the plate 54, the second membrane 58 and the bracket 60. In other embodiments, the fastener 62 can also extend through the roof substrate 16.

In the illustrated embodiment, the first membrane 52 is supported on the roof substrate 16. In one embodiment, the first membrane 52 defines a perimeter that is larger than the perimeter defined by the plate 54 and the second membrane 58. The first membrane 52 and the roof substrate 16 can be connected by spot welding, heat welding, forging, indenting the threads with pins or other projections, double-sided tape or other adhesive, by fasteners, or other permanent or semi-permanent connection. In one embodiment, the length of the first membrane is approximately sixteen inches, but the length can be larger or smaller.

The illustrated plate 54 of the roof attachment assembly 50 is substantially circular, but the plate can be other regular or non-regular shapes. The 54 is metallic, but is other embodiments the plate is polymeric. The plate 54 defines a first surface 54A positioned substantially adjacent the first membrane 52, and a second surface 55B spaced from the roof substrate and the first membrane. The frustoconical protrusion 56 of the plate 54 extends away from the roof substrate 16 along an axis 64. Further, the first surface 54A of the plate 54 forms a frustoconical recess 64 and the second surface 54B forms the frustoconical protrusion 56. The frustoconical protrusion 56 of the plate 54 defines an aperture 66 extending along the axis 64 from the first surface 54A to the second surface 54B. The first aperture 66 is substantially centrally positioned in the frustoconical protrusion 56.

In one embodiment, the plate 54 includes a plurality of openings 67 extending from the first surface 54A through the second surface 54B. The openings 67 are configured to accept fasteners 68 (e.g., bolts, screws, etc.) that couple the plate 54 to the first membrane 52 and to the roof substrate 16 of the roofing system 10. In other embodiments, the plate 54 does not use fasteners 68, but is coupled to the roof substrate 16 via other suitable non-penetrating methods or mechanisms (e.g., via adhesive, heat welding, forging, etc.).

The second membrane 58 is positioned substantially adjacent the second surface 54B of the plate 54 and is coupled to the first membrane 52. The second membrane 58 defines a surface area or a perimeter that is greater than the surface area of the plate 54. The second membrane 58 is deformable to substantially conform to the frustoconical protrusion 56 of the plate 54 when the second membrane 58 attaches to the plate 54. Further, the second membrane 58 defines an aperture 70 extending through the second membrane 58, where the aperture 70 is substantially aligned with the aperture 66 of the plate 54, such that the aperture 70 extends along the axis 64.

In one embodiment, the bracket 60 of the roof attachment assembly 50 is coupled to the second membrane 58 via the fastener 62. The bracket 60 is operable to support at least one roof-mounted assembly. The bracket 60 defines a first surface 60A spaced from the second membrane 58 and a second surface 60B positioned substantially adjacent the second membrane 58. The bracket 60 further defines an aperture 72 extending from the first surface 60A to the second surface 60B. The frustoconical protrusion 56 extends at least partially into the bracket aperture 72. Because the second membrane 58 is deformed by the frustoconical protrusion 56, the second membrane 58 also extends into the bracket aperture 72. The bracket aperture 72 is substantially aligned with the aperture 66 of the plate 54 and the aperture 70 of the second membrane 58 such the bracket aperture 72 extends along the axis 64.

The fastener 62 of the roof attachment assembly 50 is oriented along the axis 64 and extends through the aperture 66 of the plate 54, the aperture 70 of the second membrane 58, and the bracket aperture 72 to couple the plate 54 to the second membrane 58 and to the bracket 60. In one embodiment, the diameter defined by the plate 54 is greater than the diameter defined by the aperture 66 of the plate 54 and the diameter defined by the aperture 70 of the second membrane 58.

In some embodiments, the roof attachment assembly 50 is constructed without the bracket 60 or the first membrane 52 (see FIG. 4). In these embodiments, the plate 54 is directly positioned on the roof substrate 16 of the roofing system 10. The plate 54 can be heat welded, or otherwise coupled, to the second membrane 58. Further, the plate 54 can be attached to the roof substrate 16 via the fasteners 68 or by any other reasonable means. The fastener 62 extends through the aperture 66 of the plate 54 and the aperture 70 of the second membrane 58 to couple the plate to the second membrane 58.

In other embodiments, the fastener 62 of the roof attachment assembly 50 is configured to accept a compression fitting 74 (see FIG. 6). The fastener 74 further defines an attachment point 76 exposed for mechanical fastening.

Similarly to the roof attachment 18 illustrated in FIGS. 1-3, the roof attachment assembly 50 also includes at least one designed built-in failure (i.e., one or more pre-determined breaking points) that is designed to fail prior to damaging the roofing system 10. A first built-in failure in the roof attachment assembly 50 is the plate 54. Failure of the illustrated plate 54 would include deformation of the plate 54 adjacent to the aperture 66 to permit the fastener 62 to separate from the plate 54 (i.e., when the plate is metal). Therefore, in that embodiment, the pre-determined breaking point of the plate 54 is at the aperture 66. When the plate 54 is polymeric, the plate 54 can also include one or more predetermined breaking points around a perimeter of the plate 54. Therefore, failure of the plate 54 could include cracking and/or other breaking of the plate 54 to permit the plate 54 to separate from the first membrane 52. When the plate 64 is coupled to the roof substrate 16 via fasteners 68, the plate may not include any pre-determined breaking points because breaking the plate 64 at the fasteners 68 may damage the roofing system 10.

A second built-in failure in the roof attachment assembly 50 is the second membrane 58. The membrane 58 is coupled to the plate 22 and the bracket 60. The second membrane 58 can tear and fail if subjected to sufficient force by the plate 54 pulling against the membrane 58. The second membrane 58 can tear at the central aperture 70 and/or around the perimeter of the plate 54. Therefore, the second membrane 58 includes one or more predetermined breaking points at the aperture 70 and/or around the perimeter of the plate 54.

A third built-in failure in the roof attachment assembly 50 is the fastener 62. In one embodiment, the fastener 62 includes a predetermined breaking point between the head and the shaft of the fastener 62. In other embodiments, the fastener 62 can include more predetermined breaking points.

As previously described, failure of the weld between first membrane 52 and either of the plate 54 or the second membrane 58 is undesirable. Such failure of the weld can damage the roof 10, and therefore may require a patch or other repair work. Therefore, at least one of the first, second, or third built-in failures fails before the failure of the weld coupling the roof attachment assembly 18 to the roofing system 10. In other embodiments, the roof attachment assembly 50 is constructed such that more than one or all of the built-in failures fail prior to failure of the weld. As in the previously described embodiment, each of the built-in failures of the roof attachment assembly 50 can have a different failure mode. For example, one of the built-in failures fails from a pre-determined torque, another of the built-in failures fails from a pre-determined linear force, and still another of the built-in failures fails from a pre-determined shear force.

FIGS. 7-10 illustrate another construction of a roofing system 110 including a metal roof deck 112, a roof substrate 114 (e.g., insulation, tarpaper, plywood or other decking material, and the like) supported on the roof deck 112, a membrane 116 extending across the substrate 114 (i.e., placed immediately adjacent an upper surface of the substrate 114 or supported on one or more intermediate layers of roofing or sealing material, which in turn are placed on the substrate 114). The roofing system 110 can be utilized on any of a variety of roof types, such as slate roofs, membrane roofs, aluminum roofs, standing seam roofs, tile roofs, shingle roofs, and the like. Further, the roofing system 110 possesses all characteristics of the previously described roofing systems 10 shown in FIGS. 1-6.

As illustrated in FIGS. 7-10, a roof attachment assembly 118 can be coupled to the roofing system 110 with few or no fasteners extending through the membrane 116. The roof attachment assembly 118 includes a plate (also called a base member) 120 having an upwardly extending fastener 122, a membrane pad 124, a compression washer 126 having a substantially frustoconical aperture 128, a spacer 130, a flashing 132 and a hose clamp 134.

The roof attachment assembly 118 can be coupled to the roofing system 110 with any suitable non-penetrating fastening method, such as welding, adhering, gluing, bonding, and the like. The roof attachment assembly 118 is operable to support any of a variety of roof-mounted fixtures. Although the illustrated roof attachment assembly 118 is substantially square, other shapes are possible. For example, the roof attachment assembly 118 can be round, ovular, rectangular, triangular, pentagonal or other regular or non-regular shape.

The plate 120 of the roof attachment assembly 118 can include a substantially frustoconical protrusion 136 defining an aperture 137. The fastener 122 extends through the frustoconical protrusion 136 and the aperture 137 of the plate 120. The frustoconical protrusion 136 extends at least partially into the frustoconical aperture 128 of the washer 126. The washer 126 can be circular, square, ovular, pentagonal or any other suitable size and shape. In some embodiments, the washer 126 can be omitted. In the illustrated embodiment, the plate 120 and the upwardly extending fastener 122 are formed as a single unitary piece. In some embodiments, the plate 120 and the upwardly extending fastener 122 are formed as separate pieces and joined during installation.

In some embodiments, the plate 120 can include one or more stiffening ribs or flanges to increase rigidity. Other type of plates can be utilized in place of plate 120 and the roof attachment assembly 118 can include more than one plate 120. The plate 120 has a top surface 120A facing the membrane pad 124 and a bottom surface 120B facing the roof membrane 116. In some embodiments, the top surface 120A and/or the bottom surface 120B is coated with a material similar to the roof material, such as a membranous material. Embodiments in which both the top surface 120A and the bottom surface 120B are coated can omit the membrane pad 124. In one embodiment, the plate 120 is coupled to the roof by any non-penetrating fastening method, such as welding, adhering, gluing, bonding, and the like. In other embodiments, the plate 120 can be coupled to the roof by using fasteners (not shown).

In some embodiments, the plate 120 is coupled to the roof membrane 116 by any suitable non-penetrating method, and then the membrane pad 124 is coupled to the plate 120. In other embodiments, the plate 120 is coupled to the membrane pad 124 to form a single unit, and the single unit is coupled to the roof membrane 116 by any suitable non-penetrating method.

The membrane 124 has a substantially rectangular form, but other shapes of the membrane 124 are also possible. The membrane 124 is positioned adjacent to the top surface 120A of the plate 120, and defines an aperture 125 that substantially aligns with the aperture 137 of the plate 120 and the frustoconical aperture 128 of the washer 126. The membrane 124 defines a top surface 124A and a bottom surface 124B.

The pipe flashing 132 is positioned adjacent to the top surface 124A of the membrane 124. The illustrated pipe flashing 132 comprises metal, but in other embodiments, other material(s) can also be. The pipe flashing 132 can include a coating on top surface 132A and/or a bottom surface 132B. In embodiments that include a coating on the bottom surface 132B, the coating can be adhered or otherwise coupled to the membrane 124. The pipe flashing 132 defines a projection area 133 that is configured to accept at least a portion of the frustoconical protrusion 136 and the washer 126. The pipe flashing 132 further defines a flashing aperture 138 that substantially aligns with the aperture 125 of the membrane 124, the aperture 137 of the plate 120, and the frustoconical aperture 128 of the washer 126. The flashing aperture 138 has a diameter that is larger than the diameter of apertures 125, 137, and 125, such that it allows the spacer 130 to pass through the aperture 138.

In the illustrated embodiment, the perimeters of the membrane 124 and the pipe flashing 132 are substantially equal, and both perimeters are larger than the perimeter of the plate 120. In other embodiment, these elements of the roof attachment assembly 118 can have different perimeters. The fastener 122 extends through the aperture 137 of the frustoconical protrusion 136, the frustoconical aperture 128 of the washer 126, and engages the spacer 130. The spacer 130 extends through the aperture 138 of the flashing 132. In other embodiments, other fastening apparatuses and methods, or combinations of fastening apparatuses are utilized in place of washer 126, spacer 130, flashing 132 and hose clamp 134.

One suitable non-penetrating fastening method includes providing an adhesive on any of the roof membrane 116, the plate 120, the membrane 124 and the flashing 132. In some embodiments, one or more of the roof membrane 116, the plate 120, the membrane 124 and the flashing 132 comprises a meltable material that can be construed as an adhesive. In other embodiments, a separate adhesive is applied to the top 120A and/or the bottom 120B of the plate 120. The roof attachment assembly 118 is positioned on the roof membrane 116, and is then heated by a heat source, such as by an induction coil. The adhesive at least partially melts in response to the heat source. Once solidified, the adhesive can couple the roof attachment assembly 118 to the roof membrane 116. Other suitable attachment methods are possible, such as welding, gluing, adhering, bonding and the like, and the present method is given by way of example only.

In some embodiments, the membrane 124 is adhered to the roof membrane 116 to couple the roof attachment assembly 118 to the roof 110. In other embodiments, the plate 120 is adhered to the roof membrane 116 to couple the roof attachment assembly 118 to the roof 110. In some embodiments, the membrane 124 is adhered to the plate 120 and the plate 120 is adhered to the roof membrane 116 to couple the roof attachment assembly 118 to the roof 110. In other embodiments, the membrane 124 is adhered to the plate 120, and the membrane 124 is adhered to the roof membrane 116 to couple the roof attachment assembly 118 to the roof 110. In yet other embodiments, both the plate 120 and the membrane 124 are adhered to the roof membrane 116 to couple the roof attachment assembly 118 to the roof 110.

Similarly to the roof attachments described illustrated in FIGS. 1-7, the roof attachment assembly 118 also includes at least one designed built-in failure (i.e., one or more pre-determined breaking points) that is designed to fail prior to damaging the roofing system 110. A first built-in failure in the roof attachment assembly 118 is the plate 120. Failure of the plate 120 would include deformation of the plate 120 adjacent to the aperture 137 to permit the fastener 122 to separate from the plate 120 (i.e., when the plate is metal). Therefore, in that embodiment, the pre-determined breaking point of the plate 120 is at the aperture 137. When the plate 120 is polymeric, the plate 120 can also include one or more predetermined breaking points around a perimeter of the plate 120. Therefore, failure of the plate 120 could include cracking and/or other breaking of the plate 54 to permit the plate 120 to separate from the roof membrane 116.

A second built-in failure in the roof attachment assembly 118 is the membrane 124. The membrane 124 is coupled to the plate 120 and the pipe flashing 132. The membrane 124 can tear and fail if subjected to sufficient force by the plate 120 pulling against the membrane 124. The membrane 124 can tear at the central aperture 125 and/or around the perimeter of the plate 120. Therefore, the membrane 124 includes one or more predetermined breaking points at the aperture 125 and/or around the perimeter of the plate 120.

A third built-in failure in the roof attachment assembly 118 is the fastener 122. In one embodiment, the fastener 122 includes a predetermined breaking point between the head and the shaft of the fastener 122. In other embodiments, the fastener 122 can include more predetermined breaking points. For example, the fastener 122 can include a predetermined breaking point at the area where the fastener 122 engages the spacer 130.

A fourth built-in failure in the roof attachment assembly 118 is the spacer 130. In one embodiment, the spacer can be configured to fail under less or significantly less force than is required to tear and/or separate the membrane 124 or the plate 120. The spacer 130 can be configured to fail at the attachment point with the fastener 122 or at other portions of the spacer 130. In that situation, the spacer will fail prior to a failure of the membrane 124 or the plate 120 to prevent damage the roofing system 110.

In alternative embodiments, the roof attachment assembly 118 can include more built-in failures. For example, the washer 126 and the flashing 132 can also include predetermined breaking points that allow the washer 126 and the flashing 132 to fail prior to failure of the membrane 124 or the plate 120 to protect the roofing system 110 from damage.

Failure of the connection between the roof membrane 116 and either of the plate 120, the membrane 124, or the flashing 132 is undesirable. Such failure can damage the roof 110, and therefore may require a patch or other repair work. Therefore, at least one of the first, second, third, or fourth built-in failures fails before failure of the connection between the roof attachment assembly 118 and the roofing system 110. In other embodiments, the roof attachment assembly 118 is constructed such that more than one or all of the built-in failures fail prior to failure of the connection between the roof attachment assembly 118 and the roofing system 110. As in the previously described embodiments, each of the built-in failures of the roof attachment assembly 118 can have a different failure mode. For example, one of the built-in failures fails from a pre-determined torque, another of the built-in failures fail from a pre-determined linear force, and still another of the built-in failures fail from a pre-determined shear force.

What is claimed is:

1. A roof attachment assembly to be mounted on a roof substrate, the roof attachment assembly comprising:
   a plate having a substantially frustoconical protrusion, the plate defining a first surface and a second surface and including an aperture extending through the frustoconical protrusion between the first and second surfaces, the first surface facing the roof substrate and the second surface being spaced from the roof substrate;
   a first membrane positioned adjacent to the first surface of the plate;
   a second membrane positioned adjacent to the second surface of the plate;
   a bracket positioned proximate the second membrane and the second surface of the plate, the bracket operable to support one or more roof-mounted fixtures; and
   a fastener extending through the bracket, the membranes, and the plate, the fastener operable to couple the bracket, the membranes and the plate; and
   a second fastener that substantially mates with the bracket, wherein at least one of the fastener, the plate, the first membrane, and the second fastener includes at least one pre-determined breaking point.

2. The roof attachment assembly of claim 1, wherein the at least one of the fastener, the plate, the first membrane, and the second fastener is configured to fail at the at least one pre-determined breaking point when a force or a torque upon the at least one of the fastener, the plate, the first membrane, and the second fastener exceeds a pre-determined force or torque.

3. The roof attachment assembly of claim 2, wherein the roof attachment assembly is configured to separate from the roof substrate when the at least one of the fastener, the plate, the first membrane, and the second fastener fail.

4. The roof attachment assembly of claim 2, wherein the fastener is configured to fail under less force than the force required to tear the first membrane or the second membrane.

5. The roof attachment assembly of claim 2, wherein failure of the plate includes deformation of the plate adjacent to the aperture to allow the fastener to separate from the plate.

6. The roof attachment assembly of claim 2, wherein failure of the plate includes breaking of the plate to allow the fastener to separate from the plate.

7. The roof attachment assembly of claim 2, wherein the first membrane fails at a membrane aperture and around a first membrane perimeter, and wherein the first membrane perimeter is defined by a perimeter of the plate.

8. The roof attachment assembly of claim 2, wherein the second fastener is configured to fail between a head and a shaft of the second fastener.

9. The roof attachment assembly of claim 2, wherein the pre-determined force required to fail the fastener, the plate, the first membrane, and the second fastener is smaller than a force required to fail a connection between the roof substrate and the membranes.

10. The roof attachment assembly of claim 1, wherein the fastener is connected to the plate to inhibit rotation of the fastener with respect to the plate.

11. The roof attachment assembly of claim 1, wherein the bracket and the second fastener are connected to inhibit rotation of the second fastener with respect to the bracket.

12. The roof attachment assembly of claim 1, wherein the bracket defines a first recess, a second recess, and a bracket aperture extending between the first recess and the second recess.

13. The roof attachment assembly of claim 12, wherein the second recess of the bracket is sized to engage a portion of the second fastener to inhibit rotation of the second fastener within the second recess.

14. The roof attachment assembly of claim 12, wherein the frustoconical protrusion substantially matches the shape of the first recess.

15. The roof attachment assembly of claim 1, wherein the bracket matingly receives the substantially frustoconical protrusion defined by the plate.

16. The roof attachment assembly of claim 1, wherein a diameter of the second membrane is larger than a diameter of the first membrane.

17. The roof attachment assembly of claim 1, wherein the roof attachment assembly can be coupled to a flashing mounted on the roof substrate.

18. The roof attachment assembly of claim 2, wherein the pre-determined force or torque required to fail each of the fastener, the plate, the first membrane, and the second fastener is different.

19. A roof attachment assembly mounted on a roof substrate, the roof attachment assembly comprising:
a first plate having a substantially frustoconical protrusion defining an aperture extending therethrough, the plate defining a first surface and a second surface, the first surface facing the roof substrate and the second surface spaced from the roof substrate;
a membrane positioned adjacent one of the first surface and the second surface of the first plate;
a second plate positioned adjacent to the roof substrate and having a recess defining a second aperture, the second plate defining a top surface spaced from the roof substrate;
a second membrane positioned adjacent to the top surface of the second plate;
a bracket positioned proximate to at least one of the membrane and the second surface of the first plate, the bracket operable to support one or more roof mounted fixtures;
a fastener extending through and coupling the bracket, the membrane, and the first plate;
a second fastener that mates with a portion of the bracket; and
a third fastener extending through and coupling the second plate and the roof substrate,
wherein at least one of the fastener, the first plate, the membrane, and the second fastener includes at least one pre-determined breaking point.

20. The roof attachment assembly of claim 19, wherein the membrane is positioned adjacent the first surface of the plate.

21. The roof attachment assembly of claim 19, wherein the membrane is positioned adjacent the second surface of the plate.

22. The roof attachment assembly of claim 19, wherein the fastener, the first plate, the membrane, and the second fastener are configured to fail at the at least one pre-determined breaking point when a force upon the fastener, the first plate, the membrane, and the second fastener exceeds a pre-determined force or torque.

23. The roof attachment assembly of claim 20, wherein the roof attachment assembly is configured to separate from the roof substrate when the fastener, the plate, the membrane, or the second fastener fail.

24. A roof attachment assembly to be mounted on a roof substrate, the roof attachment assembly comprising:
a base member having a substantially frustoconical protrusion extending away from the roof substrate along an axis and defining an aperture extending along the axis, the base member defining a first surface and a second surface, the first surface facing the roof substrate and the second surface spaced from the roof substrate;
a membrane positioned adjacent one of the first surface and the second surface of the base member, the membrane defining a second aperture substantially aligned with the first aperture, such that the second aperture extends along the axis;
a bracket positioned proximate the membrane and the second surface of the base member, the bracket defining a first recess, a second recess, and a bracket aperture extending between the first recess and the second recess, the bracket operable to support at least one roof-mounted assembly, the bracket aperture substantially aligned with the first aperture and the second aperture, such the bracket aperture extends along the axis;
a fastener extending through the bracket, the membrane, and the base member, the fastener operable to couple the bracket, the membrane and the base member; and
a second fastener that substantially mates with the bracket, wherein at least one of the fastener, the base member, the membrane, and the second fastener includes at least one pre-determined breaking point.

25. The roof attachment assembly of claim 24, wherein the membrane is positioned adjacent the first surface of the base member.

26. The roof attachment assembly of claim 24, wherein the membrane is positioned adjacent the second surface of the base member.

27. A roof attachment assembly to be mounted on a roof substrate, the roof attachment assembly comprising:
a first membrane supportable on the roof substrate;
a base member that defines a first surface positioned substantially adjacent the first membrane and a second surface spaced from the roof substrate and the first membrane, the base member defining a surface area, the base member including a frustoconical protrusion extending away from the roof substrate along an axis, the first surface forms a frustoconical recess and the second surface forms the frustoconical protrusion, the base member defines a first aperture extending along the axis from the first surface to the second surface, the first aperture substantially centrally positioned in the frustoconical protrusion;

a second membrane coupled to the first membrane and coupled to the base member, the second membrane positioned substantially adjacent the base member second surface, the second membrane defining a surface area, wherein the second membrane surface area is greater than the surface area of the base member, the second membrane being deformable to substantially conform to the frustoconical protrusion of the base member, the second membrane defining a second aperture extending therethrough, the second aperture being substantially aligned with the first aperture, such that the second aperture extends along the axis; and a fastener oriented along the axis, the fastener extending through the first aperture and the second aperture to couple the base member to the second membrane, wherein at least one of the fastener, the base member, and the second membrane includes at least one pre-determined breaking point.

28. The roof attachment assembly of claim 27, wherein the base member is coupled to the roof substrate by at least one second fastener.

29. The roof attachment assembly of claim 27, wherein the roof attachment assembly is coupled to the roof substrate by heat welding.

30. A roof attachment assembly to be mounted on a roof substrate, the roof attachment assembly comprising:

a first membrane supportable on the roof substrate;

a base member that defines a first surface positioned substantially adjacent the first membrane and a second surface spaced from the roof substrate and the first membrane, the base member defining a surface area, the base member including a frustoconical protrusion extending away from the roof substrate along an axis, the first surface forms a frustoconical recess and the second surface forms the frustoconical protrusion, the base member defines a first aperture extending along the axis from the first surface to the second surface, the first aperture substantially centrally positioned in the frustoconical protrusion;

a second membrane coupled to the first membrane and coupled to the base member, the second membrane positioned substantially adjacent the base member second surface, the second membrane defining a surface area, wherein the second membrane surface area is greater than the surface area of the base member, the second membrane being deformable to substantially conform to the frustoconical protrusion of the base member, the second membrane defining a second aperture extending therethrough, the second aperture being substantially aligned with the first aperture, such that the second aperture extends along the axis;

a bracket coupled to the second membrane, the bracket defining a first surface spaced from the second membrane and a second surface positioned substantially adjacent the second membrane, the bracket defining an aperture extending from the first surface to the second surface, the bracket is operable to support a roof-mounted assembly, the bracket aperture is substantially aligned with the first aperture and the second aperture, such the bracket aperture extends along the axis; and a fastener oriented along the axis, the fastener extending through the first aperture, the second aperture and the bracket aperture to couple the base member to the second membrane and to the bracket, wherein at least one of the fastener, the base member, and the second membrane includes at least one pre-determined breaking point.

31. The roof attachment assembly of claim 30, wherein the base member is coupled to the roof substrate by at least one second fastener.

32. The roof attachment assembly of claim 30, wherein the frustoconical protrusion extends at least partially into the bracket aperture, and the second membrane is deformed by the frustoconical protrusion, such that the second membrane extends into the bracket aperture.

33. The roof attachment assembly of claim 30, wherein the fastener is a bolt that further extends through the roof substrate.

34. The roof attachment assembly of claim 30, wherein the first membrane defines a surface area, and wherein the first membrane surface area is greater than the second membrane surface area.

35. The roof attachment assembly of claim 30, wherein the base member is substantially circular and defines a diameter, and wherein the base member diameter is greater than the first aperture diameter and greater than the second aperture diameter.

* * * * *